US011408118B2

(12) United States Patent
Yano et al.

(10) Patent No.: US 11,408,118 B2
(45) Date of Patent: Aug. 9, 2022

(54) CLOTH CLAMPING CHUCK AND CLOTH HANDLING DEVICE

(71) Applicant: PUREX CO., LTD., Takamatsu (JP)

(72) Inventors: Makoto Yano, Takamatsu (JP); Yuichiro Yabe, Takamatsu (JP)

(73) Assignee: PUREX CO., LTD., Takamatsu (JP)

( * ) Notice: Subject to any disclaimer, the term of this patent is extended or adjusted under 35 U.S.C. 154(b) by 0 days.

(21) Appl. No.: 17/045,930

(22) PCT Filed: Apr. 10, 2019

(86) PCT No.: PCT/JP2019/015574
§ 371 (c)(1),
(2) Date: Oct. 7, 2020

(87) PCT Pub. No.: WO2019/198740
PCT Pub. Date: Oct. 17, 2019

(65) Prior Publication Data
US 2021/0172113 A1    Jun. 10, 2021

(30) Foreign Application Priority Data
Apr. 12, 2018   (JP) .............................. JP2018-077145

(51) Int. Cl.
*D06F 89/00* (2006.01)
*B25J 15/00* (2006.01)

(52) U.S. Cl.
CPC .......... *D06F 89/00* (2013.01); *B25J 15/0028* (2013.01)

(58) Field of Classification Search
CPC ........ D06F 89/00; D06F 67/04; B25J 15/0028
See application file for complete search history.

(56) References Cited

U.S. PATENT DOCUMENTS 3,696,942 A * 10/1972 Kitchener ............ B65G 47/902
                                                414/13
4,885,853 A * 12/1989 McCabe ................. D06F 67/04
                                                38/143

(Continued)

FOREIGN PATENT DOCUMENTS

CN        201593129 U     9/2010
CN        106219297 A    12/2016

(Continued)

OTHER PUBLICATIONS

Jul. 16, 2019 Search Report issued in International Patent Application No. PCT/JP2019/015574.

(Continued)

*Primary Examiner* — Ismael Izaguirre
(74) *Attorney, Agent, or Firm* — Oliff PLC

(57) ABSTRACT

A cloth clamping chuck includes a pair of chuck jaws and a driving process that rotates at least one of the pair of chuck jaws around an open-close axis x to change an opening degree of the pair of chuck jaws. The cloth clamping chuck has a catching portion which is arranged in a position out of an extension line of the chuck jaws, and in associated with the pulling operation of cloth, is caught in a portion of the cloth other than the portion clamped by the pair of chuck jaws to deflect a force applied to the clamped portion of the cloth toward a side along the open-close axis.

18 Claims, 28 Drawing Sheets

(56) References Cited

U.S. PATENT DOCUMENTS

| | | | | |
|---|---|---|---|---|
| 5,349,768 | A * | 9/1994 | Ishihara | D06F 95/00 38/143 |
| 6,655,890 | B1 * | 12/2003 | Weir | B65G 47/1478 414/13 |
| 7,341,295 | B1 | 3/2008 | Veatch et al. | |
| 9,222,213 | B2 * | 12/2015 | Garrone | D06F 67/04 |
| 9,630,780 | B2 * | 4/2017 | Sielermann | D06F 93/00 |

FOREIGN PATENT DOCUMENTS

| | | |
|---|---|---|
| DE | 4202380 A1 * | 1/1993 |
| DK | 2015 70341 A1 | 2/2016 |
| GB | 1145178 A | 3/1969 |
| JP | 2010-222724 A | 10/2010 |
| WO | WO 2018059730 A1 * | 4/2018 |

OTHER PUBLICATIONS

May 3, 2021 Extended Search Report issued in European Patent Application No. 19786175.0.

May 11, 2022 Office Action issued in Chinese Application No. 201980024594.0.

* cited by examiner (a)

(b)

(a)

(b)

(a)

(b)

(a)

(b)

CLOTH CLAMPING CHUCK AND CLOTH HANDLING DEVICE

TECHNICAL FIELD

The present invention relates to a cloth clamping chuck used in a cloth washing factory, and a cloth handling device having the same.

BACKGROUND ART

A cloth handling device constituting an automatic cloth spreading (feeding) machine or the like which is used in a cloth washing factory or the like includes many cloth clamping chucks, each of which clamps a neighborhood of a corner end of the cloth (see, for example, Patent Literature 1). Most of the cloth clamping chucks are a fulcrum opening type wherein one or both of chuck jaws are rotationally moved around an open-close axis to change an opening degree of the chuck jaw as shown in FIGS. 41(a) and (b). As a use embodiment thereof, the pulling-in, lifting, pulling-down and the like of the cloth are frequently conducted by moving the chuck jaw in a pulling direction (a direction from a top of the chuck jaw toward a base end thereof) after the clamping pf the cloth as shown in FIGS. 42(a)-(c).

CITATION LIST

Patent Literature

Patent Literature 1: JP-A-2010-222724

SUMMARY OF INVENTION

Technical Problem

When the fulcrum-opening-type cloth clamping chuck is moved in the pulling direction (rightward in the figure) after the clamping of the cloth as shown in FIG. 43, however, reaction force N is applied to the cloth in a direction from the base end toward the tip along an extending direction of the chuck jaw (leftward in the figure) to act to open of the chuck jaws. Thus, the position of the cloth that is clamped with the chuck jaws is shifted toward the tip little by little, and finally the cloth may be fallen down from the chuck jaws. In particular, the holding force is weak in the vicinity of the tip of the chuck jaw which is away from the open-close axis, as compared to the base end side of the chuck jaw, in a relation to moment power, so that the cloth is easily fallen off when it shifts toward the tip side. Further, the cloth may be damaged when the clamping position of the cloth is shifted in the chuck jaws.

An object of the present invention is to solve the problem with the above prior art and reduce the falling off of the cloth while avoiding the damage of the cloth, when the cloth clamping chuck is moved in the pulling direction with clamping the cloth.

Solution to Problem

The present invention lies in a cloth clamping chuck comprising a pair of chuck jaws and a driving means that changes an opening degree of the chuck jaws by rotating at least one of the pair of chuck jaws around an open-close axis, and conducting a pulling operation after the pair of chuck jaws are closed to clamp cloth, and, in order to solve the above problem, the cloth clamping chuck further comprises a catching portion that is arranged in a position out of an extension line of the chuck jaw and, in associated with the pulling operation, is caught in a portion of the cloth other than the portion clamped by the pair of chuck jaws to deflect a force applied to the clamped portion of the cloth toward a side along the open-close axis.

In the cloth clamping chuck according to the present invention, it is preferable that the catching portion is extended in a direction perpendicular to the open-close axis and the pulling direction at a closed posture of the pair of chuck jaws.

In the cloth clamping chuck according to the present invention, it is preferable that the catching portion is arranged forward of the tip of chuck jaw.

Also, a cloth handling device according to the present invention that solves the above problem comprises any one of the above-described cloth clamping chucks and a moving means for conducting the pulling operation of the cloth clamping chuck.

Advantageous Effects of Invention

In the cloth clamping chuck according to the present invention, for example, the vicinity of the corner end of the cloth is positioned between the pair of the opened chuck jaws, and then the pair of the chuck jaws are closed by the driving means, whereby the cloth is at a state of being clamped between the pair of chuck jaws. When the cloth clamping chuck is moved from this state into the pulling direction (direction from the tip of the chuck jaw to the base end thereof), the neighborhood of the clamped portion of the cloth is caught by the catching portion so as to increase an area on the cloth where the force is applied, while a force deviating the cloth toward a side where the cloth is hardly shifted from the chuck jaws (direction along the open-close axis of the chuck jaw) is applied to the clamped portion of the cloth, whereby damages associated with the falling off of the cloth from the chuck jaw or position shifting is suppressed.

Therefore, the present invention enables to solve the problem of the prior art, and also reduce the falling off the cloth while avoiding damage of the cloth caused, when the cloth is clamped by the cloth clamping chuck and moved in the pulling direction.

DESCRIPTION OF EMBODIMENTS

An embodiment of the present invention will be described in detail below based on the drawings. A cloth clamping chuck and a cloth handling device having the same according to the present invention are suitable for operations such as pulling-in, lifting, pulling-down and so on of the cloth in a cloth processing apparatus such as automatic cloth spreading (feeding) machine, cloth separating machine and the like installed in a cloth washing factory or the like. The present invention will be described by taking, as one example of use, an example in which the cloth clamping chuck and the cloth handling device having the same of the embodiment is applied to the automatic cloth spreading machine in the following.

Figure 1:
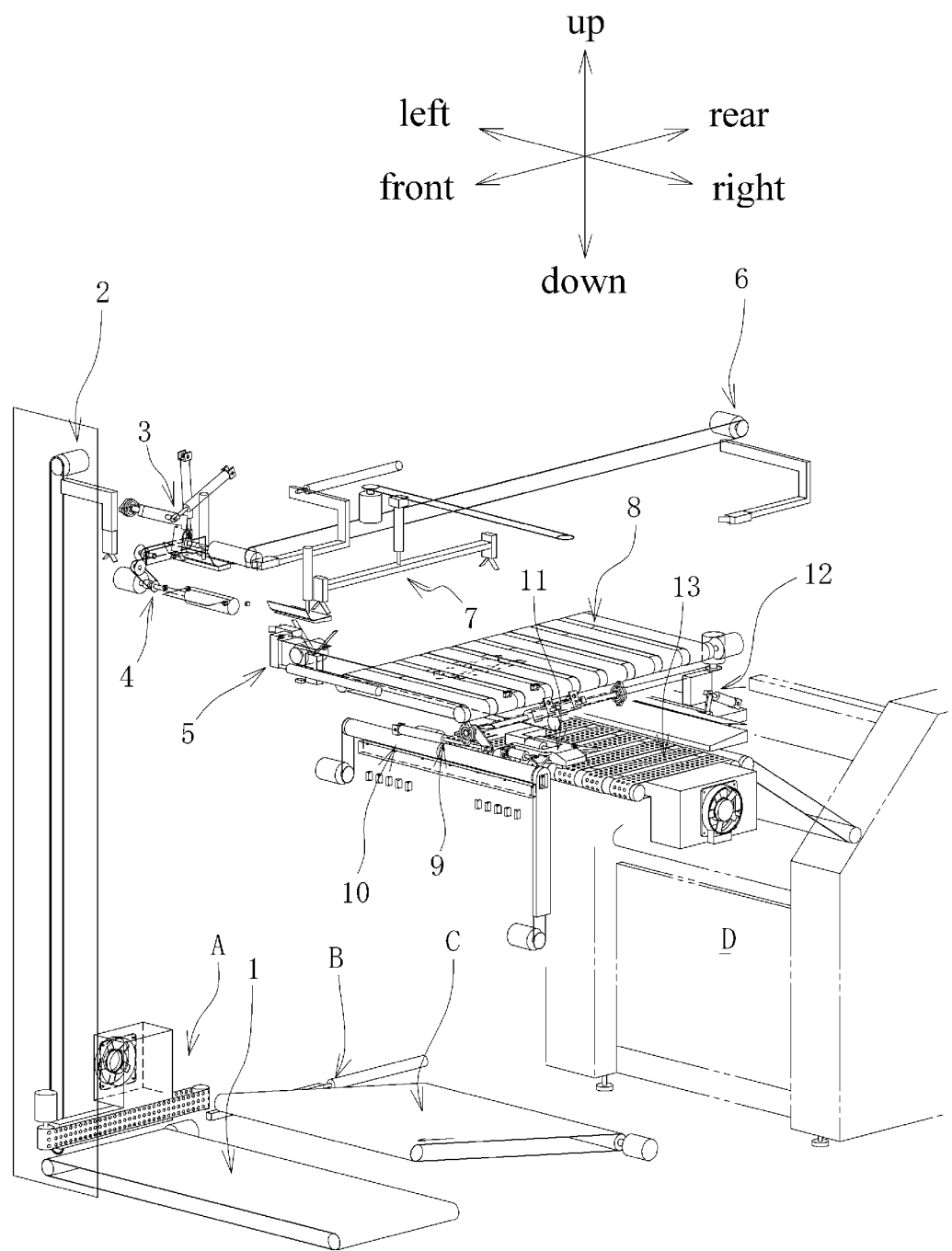
FIG. 1 is a schematic overall view of an automatic cloth spreading machine.

FIG. 1 shows an overall view of the automatic cloth spreading machine, and FIG. 2 to FIG. 34 show individual devices that are parts of the automatic cloth spreading machine of FIG. 1. In the following description, the directions of front, rear, right, left, up, and down refer to those directions in the state of FIG. 1.

The automatic cloth spreading machine automatically spreads washed and dried pieces of cloth, such as towels, sheets, duvet covers, pillow covers, or Japanese bathrobes. As shown in FIG. 1, the automatic cloth spreading machine mainly includes a supply conveyor 1, a lifting device 2, a temporary holding device 3, a corner end locating device 4, a corner end receiving device 5, a horizontal pulling device 6, a two-position holding device 7, an edge locating conveyor 8, a vertically inverting device 9, a roller 10, a hanging device 11, a forward-backward moving device 12, a transfer conveyor 13, and a controller (not shown) that controls the operations of the devices 1 to 13. In FIG. 1, a suction conveyor A, a push-out device B, a return conveyor C, and a cloth folding machine D are shown as assisting or related devices. The return conveyor C returns cloth that has fallen during processing to the supply conveyor 1.

The automatic cloth spreading machine operates roughly as follows: The supply conveyor 1 supplies washed and dried cloth to under the lifting device 2. The lifting device 2 lifts the cloth to a predetermined level. The temporary holding device 3 receives the lifted cloth, temporarily holds the cloth, and moves the cloth to a position at which the cloth is passed to the corner end locating device 4. The corner end locating device 4 receives an arbitrary portion of the cloth hanging from the temporary holding device 3 and reveals a corner end of the cloth. The corner end receiving device 5 holds this corner end, and moves the cloth toward the horizontal pulling device 6 while supporting the cloth in a drooping state. The horizontal pulling device 6 lays the cloth substantially horizontally in a front-rear direction. The two-position holding device 7 holds the laid cloth at two positions, one near a corner end and the other at an intermediate portion away from the corner end by an appropriate distance, at the same level, moves the cloth to above the edge locating conveyor 8, and then releases the intermediate portion of the cloth being held. The edge locating conveyor 8 receives thereon another portion of the cloth being held at the corner end by the two-position holding device 7, and moves that portion so as to reveal one long-side edge of the cloth. The vertically inverting device 9 holds the long-side edge of the cloth coming down from the edge locating conveyor 8, inverts the cloth upside down, and then holds the cloth in a drooping state. A hanging device 11 that moves above the roller 10 in a left-right direction along the roller 10 receives the long-side edge of the cloth from the vertically inverting device 9 and hangs the drooping cloth on the roller 10. The roller 10 advances the cloth hung thereon such that the cloth droops toward the forward-backward moving device 12 while a short-side edge of the cloth is left on the roller 10. The forward-backward moving device 12 moves forward and receives the short-side edge of the cloth left on the roller 10, moves backward while holding the edge of the cloth, and then moves the cloth in a spread state onto the transfer conveyor 13. The transfer conveyor 13 discharges the spread cloth and feeds the cloth, for example, into the cloth folding machine D in the next step.

Figure 2:
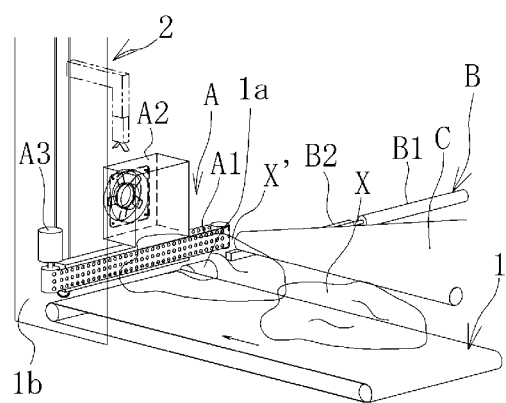
FIG. 2 is an enlarged perspective view of a supply conveyor and a lifting device of the automatic cloth spreading machine of FIG. 1.
Figure 3:
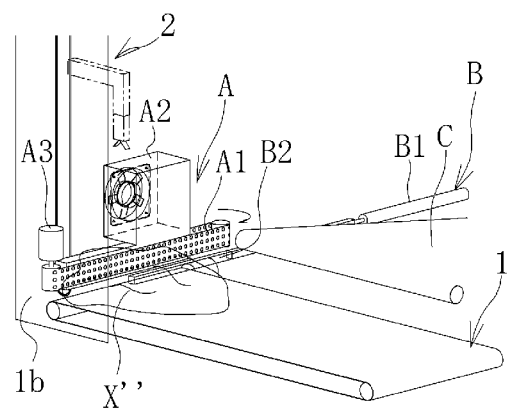
FIG. 3 is an enlarged perspective view of the supply conveyor and the lifting device of the automatic cloth spreading machine of FIG. 1.

Each device will be described in detail. First, as shown in FIG. 1 to FIG. 3, the supply conveyor 1 may be continuously run by a motor 1a during operation. A mass X consisting of, for example, about 10 to 50 washed and dried, still balled-up rectangular pieces of cloth Y is thrown onto the supply conveyor 1. The supply conveyor 1 transfers the mass X of cloth Y to under the lifting device 2 (indicated by reference sign X' in FIG. 2). The suction conveyor A is provided at a terminal end of the supply conveyor 1 in a transfer direction. The suction conveyor A is composed of a perforated belt A1, a suction fan A2 that suctions the cloth Y on the supply conveyor 1 through the perforated belt A1, and a motor A3 that drives the perforated belt A1 to rotate and thereby transfers the suctioned cloth Y to directly under the lifting device 2 (indicated by reference sign X″ in FIG. 3). A wall 1b that prevents the mass X from falling off the supply conveyor 1 is erected near a terminal end of the perforated belt A1. In addition to or instead of the suction conveyor A, the push-out device B that pushes the cloth on the supply conveyor 1 to directly under the lifting device 2 may be provided at the terminal end of the supply conveyor 1 in the transfer direction. The push-out device B is composed of a cylinder B1 and a push-out rod B2 that is moved forward and backward by the cylinder B1.

Figure 4:
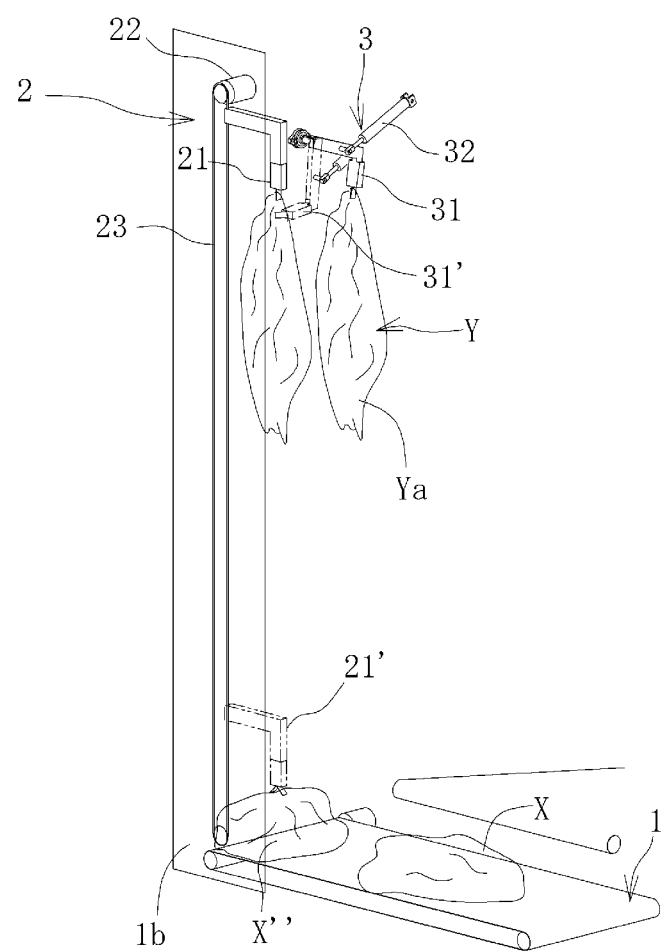
FIG. 4 is an enlarged perspective view of the supply conveyor and the lifting device of the automatic cloth spreading machine of FIG. 1.

The lifting device 2 has a chuck 21 that holds an arbitrary portion of the cloth Y, and an upward-downward moving device that moves the chuck 21 upward and downward. In the example of FIG. 4, the upward-downward moving device is composed of a driving belt 23 and a motor 22. The upward-downward moving device may have any structure as long as it can move the chuck 21 upward and downward between a predetermined level and a transfer surface of the supply conveyor 1. For example, a chain-driven device or a slider unit that travels upward and downward along a rail may be used. When the chuck 21 of the lifting device 2 is moved by the driving belt 23 and the motor 22 to a lowermost position (the position indicated by the imaginary lines and reference sign 21' in FIG. 4), the chuck 21 comes into contact with the cloth Y located at the terminal end of the supply conveyor 1 and holds the contact portion of the cloth Y. The portion of the cloth held by the chuck 21 may be an arbitrary portion. When the chuck 21 is moved upward, the chuck 21 is raised to a predetermined level (uppermost position) indicated by the solid lines in FIG. 4 while holding the cloth Y, and then holds the cloth Y in a hanging state. Here, two or more pieces of cloth Y may be held and lifted by the chuck 21.

As shown in FIG. 1 and FIG. 4, the temporary holding device 3 has a chuck 31 and a forward-backward moving device (extending-contracting cylinder 32) that moves the chuck 31 forward and backward in the front-rear direction. When the chuck 21 of the lifting device 2 moves to the uppermost position, or the cloth Y held by the chuck 21 at the uppermost position is detected by a sensor (not shown), the extending-contracting cylinder 32 of the temporary holding device 3 extends and moves the chuck 31 forward to the position indicated by the imaginary lines (indicated by reference sign 31') in FIG. 4, and the chuck 31 of the temporary holding device 3 receives a portion near an upper end portion of the cloth Y lifted by the lifting device 2. (At this point, the chuck 21 of the lifting device 2 releases the cloth Y.) Thereafter, the extending-contracting cylinder 32 contracts and moves the chuck 31 backward to a predetermined position as indicated by the solid lines in FIG. 4, with the cloth Y hanging from the chuck 31. In most cases, one of corner ends of the cloth appears at a lowermost end (indicated by reference sign Ya in FIG. 4) of the cloth Y hanging from the chuck 31.

As shown in FIG. 5 to FIG. 9, the corner end locating device 4 has: a chuck 41 that receives the cloth Y hung and held by the chuck 31 of the temporary holding device 3 at its backward position; a forward-backward moving device (extending-contracting cylinder 42) that moves the chuck 41 forward and backward in the front-rear direction; a platform 43 on an upper side of which the cloth Y is placed; a sensor 49 that is formed by a phototube, for example, and detects a terminal end portion (corner end Ya) of the cloth Y being dragged over the platform 43; a pressing plate 47 that holds a central portion of the cloth Y on the platform 43 between the pressing plate 47 and the platform 43; an extending-contracting cylinder 48 that moves the pressing plate 47 upward and downward; a pair of corner end locating rollers 44, 45; and an extending-contracting cylinder 46 that moves the one corner end locating roller 45 closer to or separated from the other corner end locating roller 44.

Figure 5:
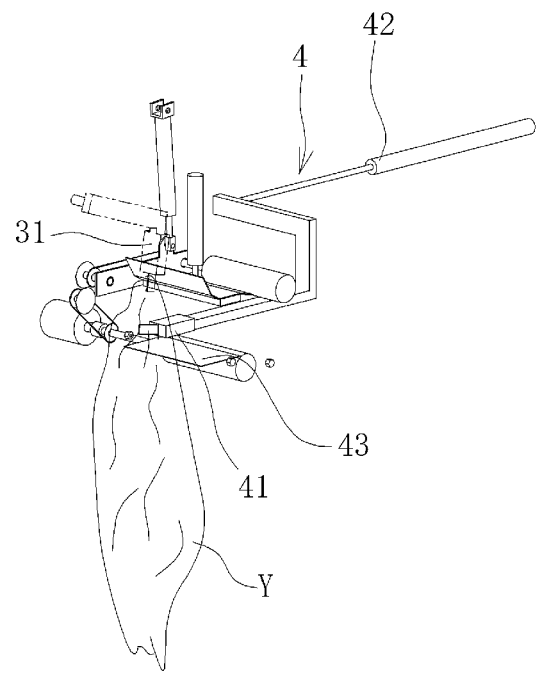
FIG. 5 is an enlarged perspective view of a temporary holding device and a corner end locating device of the automatic cloth spreading machine of FIG. 1.
Figure 6:
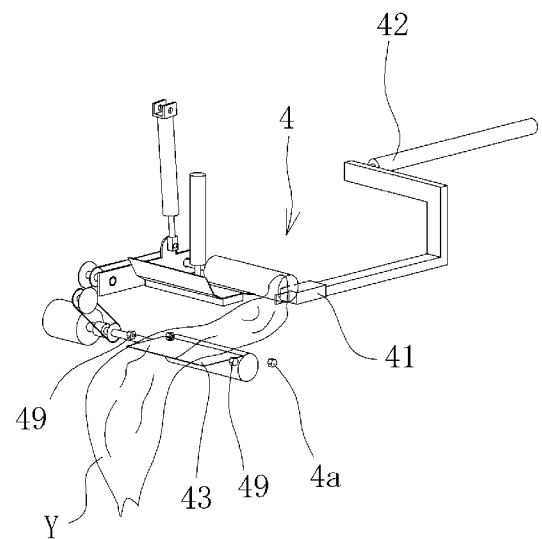
FIG. 6 is an enlarged perspective view of the corner end locating device of the automatic cloth spreading machine of FIG. 1.
Figure 7:
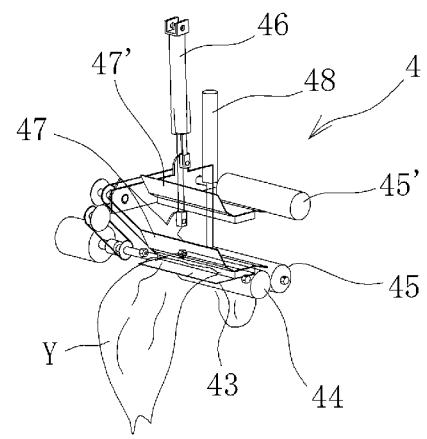
FIG. 7 is an enlarged perspective view of the corner end locating device of the automatic cloth spreading machine of FIG. 1.
Figure 8:
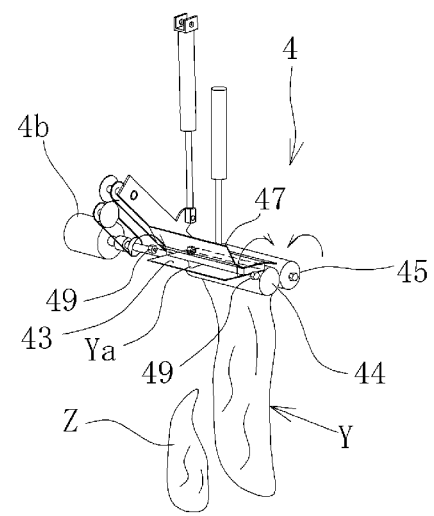
FIG. 8 is an enlarged perspective view of the corner end locating device of the automatic cloth spreading machine of FIG. 1.
Figure 9:
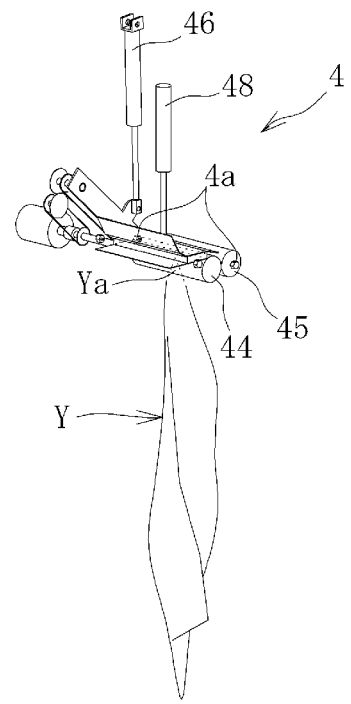
FIG. 9 is an enlarged perspective view of the corner end locating device of the automatic cloth spreading machine of FIG. 1.

When the chuck 31 of the temporary holding device 3 moves to the backward position while holding the cloth Y as shown in FIG. 5, the extending-contracting cylinder 42 of the corner end locating device 4 extends to move the chuck 41 forward, and the chuck 41 receives the cloth Y from the chuck 31 of the temporary holding device 3. Subsequently, as shown in FIG. 6, the extending-contracting cylinder 42 contracts, so that the chuck 41, while holding the cloth Y, pulls in the cloth Y a predetermined distance over the platform 43 before releasing the cloth Y. Then, as shown in FIG. 7, the corner end locating roller 45 located on a far side moves downward from the position indicated by reference sign 45' and catches a leading end portion of the cloth Y between the corner end locating roller 45 and the corner end locating roller 44 on a near side. The pressing plate 47 moves downward from the raised position indicated by reference sign 47' and holds a central portion of the cloth Y between the pressing plate 47 and the platform 43. In this state, as shown in FIG. 8, the corner end locating rollers 44, 45 rotate in the arrow directions, so that the cloth Y droops. When the terminal end portion (forming the corner end Ya) of the cloth Y being dragged over the platform 43 is detected by the sensors 49, 49 (or when the sensors 49, 49 stop detecting the cloth Y), the rotation speed of both the corner end locating rollers 44, 45 is switched to a low speed. When there is a plurality of pieces of cloth Y, pieces of cloth Z other than one piece of cloth Y that is held at the terminal end portion between the platform 43 and the pressing plate 47 will fall in the course of this series of actions. Thereafter, when the terminal end portion (corner end Ya) of the cloth Y is detected by other sensors 4a, 4a that are formed by phototubes, for example, and disposed between the corner end locating rollers 44, 45 (or when the sensors 4a, 4a stop detecting the cloth Y), the corner end locating rollers 44, 45 stop rotating, and the corner end Ya or a portion near the corner end Ya of the cloth Y is caught and held between the corner end locating rollers 44, 45, which completes a corner end locating task.

In the shown example, the cloth Y lifted by the lifting device 2 is temporarily held by the temporary holding device 3 and then handed over to the chuck 41 of the corner end locating device 4. In another embodiment (not shown), the temporary holding device 3 may be omitted and the cloth Y lifted by the lifting device 2 may be directly held by the chuck 41 of the corner end locating device 4.

Figure 10:
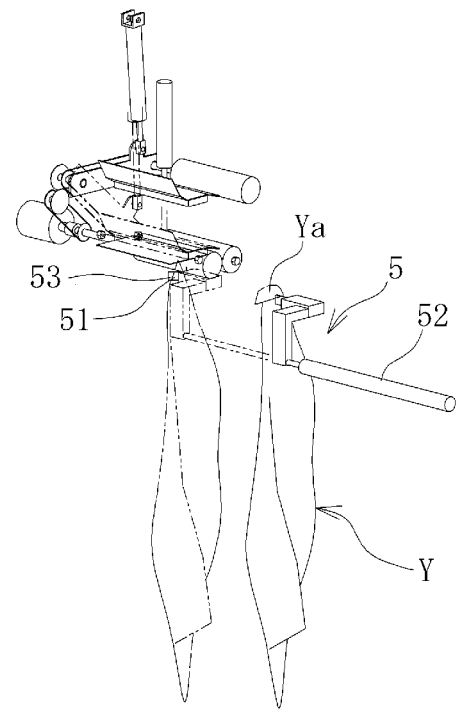
FIG. 10 is an enlarged perspective view of the corner end locating device and a corner end receiving device of the automatic cloth spreading machine of FIG. 1.

As shown in FIG. 10, the corner end receiving device 5 has a chuck 51 disposed under the corner end locating rollers 44, 45, and a forward-backward moving device (extending-contracting cylinder 52) that moves the chuck 51 forward and backward in the left-right direction (see FIG. 1) within a range directly under a contact portion of the corner end locating rollers 44, 45. When the corner end Ya or a portion near the corner end of the cloth Y is being held by the pair of corner end locating rollers 44, 45 of the corner end locating device 4, the extending-contracting cylinder 52 of the corner end receiving device 5 extends and moves the chuck 51 forward in a leftward direction as indicated by the imaginary lines in FIG. 10. The chuck 51 holds the cloth Y at a position a little below the corner end Ya and moves backward toward the right side (toward the horizontal pulling device 6) with the cloth Y drooping from the chuck 51'. A sensor 53 that detects the cloth Y is mounted on the chuck 51. The chuck 51 is activated upon the sensor 53 detecting that the chuck 51 has come close to the cloth Y, so that the chuck 51 can reliably hold the cloth Y.

Figure 11:
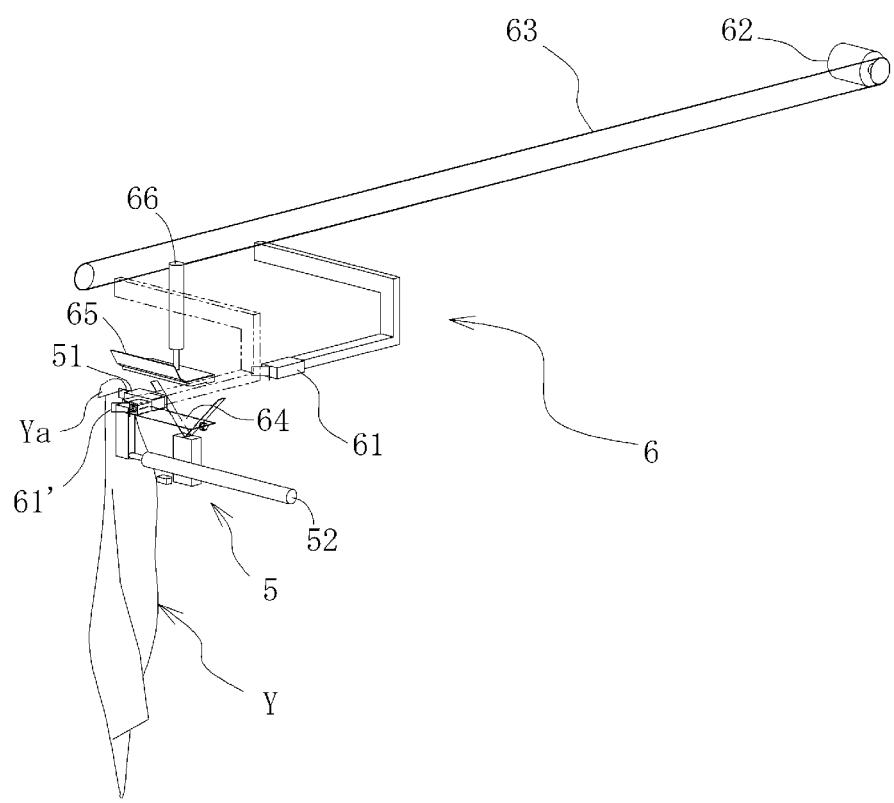
FIG. 11 is an enlarged perspective view of the corner end receiving device and a horizontal pulling device of the automatic cloth spreading machine of FIG. 1.

A platform 64 is provided at a position in the immediate vicinity of a lower rear side of the chuck 51 in a state where the extending-contracting cylinder 52 of the corner end receiving device 5 is contracted (see FIG. 11). The platform 64 supports a terminal end side of the cloth Y when a portion near the upper end portion (corner end Ya) of the cloth is received and moved rearward by the horizontal pulling device 6 to be described next.

In this embodiment, to reveal one corner end Ya of the rectangular cloth Y, the lifting device 2, the temporary holding device 3, and the corner end locating device 4 are used such that the corner end of the rectangular cloth in a balled-up state can be automatically located. Alternatively, this cloth corner end locating task may be performed, for example, by a worker manually finding one corner end of a balled-up piece of cloth Y. In this case, the worker may manually have the found corner end Ya of the cloth received by the chuck 51 of the corner end receiving device 5 or directly received by a chuck 61 of the horizontal pulling device 6 to be described below.

Figure 12:
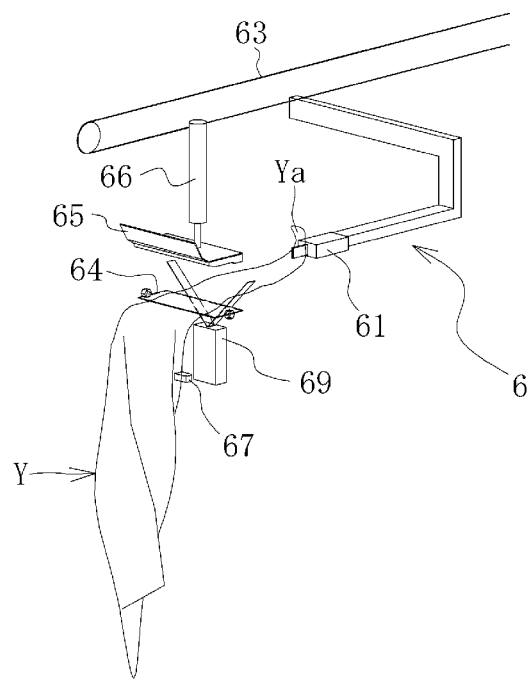
FIG. 12 is an enlarged perspective view of the horizontal pulling device of the automatic cloth spreading machine of FIG. 1.
Figure 13:
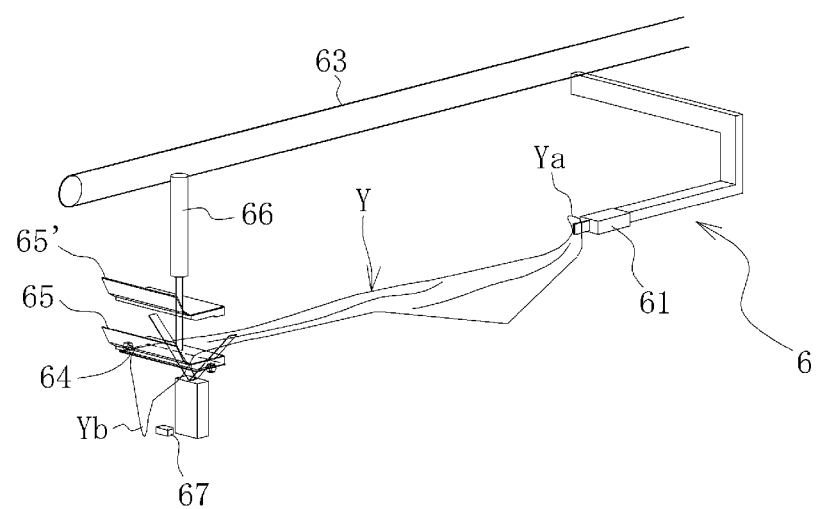
FIG. 13 is an enlarged perspective view of the horizontal pulling device of the automatic cloth spreading machine of FIG. 1.
Figure 14:
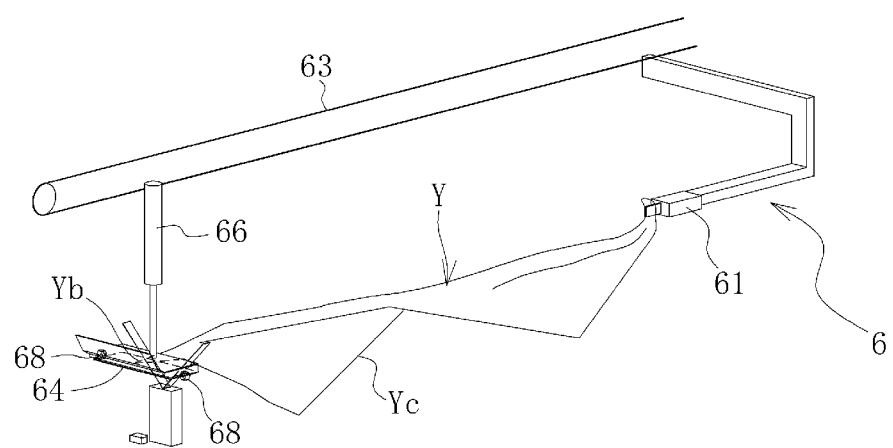
FIG. 14 is an enlarged perspective view of the horizontal pulling device of the automatic cloth spreading machine of FIG. 1.

As shown in FIG. 11 to FIG. 14, the horizontal pulling device 6 has the chuck 61 and a forward-backward moving device that moves the chuck 61 forward and backward in the front-rear direction. In the shown example, the forward-backward moving device is composed of a driving belt 63 that holds the chuck 61, and a motor 62 that moves the chuck 61 forward and backward in the front-rear direction by rotating a pulley around which the driving belt 63 is wrapped. However, the forward-backward moving device may have any structure and, for example, an extending-contracting cylinder can also be used. As shown in FIG. 11, when the chuck 51 of the corner end receiving device 5 holds the cloth Y and moves backward, the chuck 61 of the horizontal pulling device 6 moves forward to the position indicated by the imaginary lines and reference sign 61' in the drawing, and the chuck 61' at this forward position holds the cloth at a position a little below the upper end portion (corner end Ya). Subsequently, after the chuck 51 of the corner end receiving device 5 releases the cloth Y, as shown in FIG. 12, the chuck 61 is moved rearward while holding the cloth at a position near the corner end Ya to thereby pull the cloth Y horizontally over the platform 64. Then, as shown in FIG. 13, after the cloth Y is horizontally pulled a predetermined distance, an upper pressing plate 65 is moved downward by an extending-contracting cylinder 66 from the raised position indicated by reference sign 65' and holds the cloth Y between the upper pressing plate 65 and the platform 64. Also thereafter horizontal pulling continues, and when a sensor 67 disposed under the platform 64 detects a terminal end portion Yb of the cloth Y (or when the sensor 67 stops detecting the cloth Y), the speed of horizontal pulling is switched to a low speed. As shown in FIG. 14, when another sensor 68 disposed near the platform 64 detects the terminal end portion Yb of the cloth Y (or when the sensor 68 stops detecting the cloth Y), horizontal pulling is stopped. Here, the cloth Y is in a state where the two corner ends other than the corner end Ya held by the chuck 61 and the corner end Yb pressed by the upper pressing plate 65 are in line in the front-rear direction and one long-side edge Yc appears in the drooping portion (a state of having a triangular shape).

Figure 15:
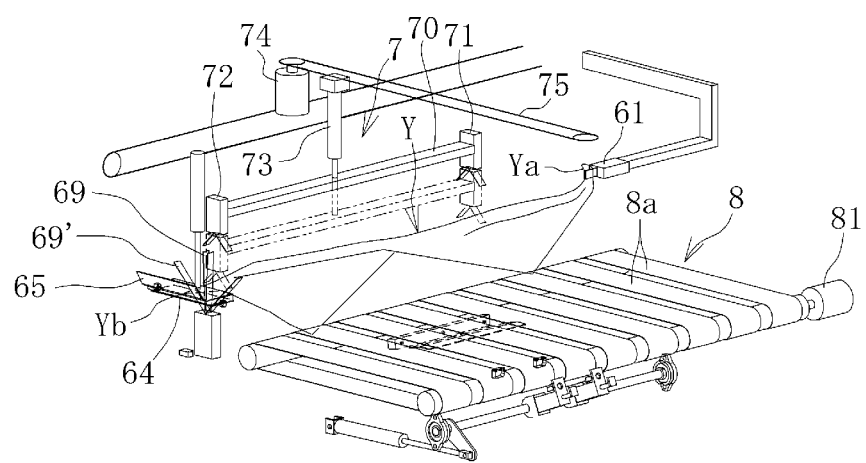
FIG. 15 is an enlarged perspective view of the horizontal pulling device, a two-position holding device, an edge locating conveyor, and a vertically inverting device of the automatic cloth spreading machine of FIG. 1.

As shown in FIG. 15, the edge locating conveyor 8 that is driven by a motor 81 is installed to the right of the platform 64 and the upper pressing plate 65. The edge locating conveyor 8 is formed by a plurality of (in the shown example, nine) thin belts 8a extending in the left-right direction that is disposed at intervals in the front-rear direction.

As shown in FIG. 15 to FIG. 20, the two-position holding device 7 has: two chucks 71, 72 (hereinafter also referred to as an intermediate portion holding chuck 71 and a corner end holding chuck 72) mounted respectively at a rear end and a front end of a coupling rod 70 that extends in the front-rear direction; an upward-downward moving cylinder 73 that moves the chucks 71, 72 upward and downward; and a forward-backward moving device that moves the chucks 71, 72, together with the upward-downward moving cylinder 73, forward and backward in the left-right direction. The forward-backward moving device is composed of a driving belt 75 that holds the upward-downward moving cylinder 73 in a vertical state, and a motor 74 that rotates a pulley wrapped around the driving belt 75. However, the forward-backward moving device may have any structure as long as it can move the chucks 71, 72 in the left-right direction, and a forward-backward moving cylinder may also be used. The distance between the chucks 71, 72 may be made appropriately changeable according to the size etc. of the cloth Y to be processed, for example, by using a length-adjustable coupling rod 70 or adopting a structure that allows changes in the mounting positions of the chucks 71, 72 on the coupling rod 70.

As shown in FIG. 15, the corner end holding chuck 72 is located at a position at which it can hold a front-side end portion (corner end) Yb of the cloth Y laid by the horizontal pulling device 6, while the intermediate portion holding chuck 71 is located at a position at which it can hold an appropriate portion of an intermediate portion on the rear side of the laid cloth Y.

In its contracted state, the upward-downward moving cylinder 73 keeps the chucks 71, 72 on standby at positions above the laid cloth Y (the state indicated by the solid lines in FIG. 15), and in its extended state, the upward-downward moving cylinder 73 moves the chucks 71, 72 downward to positions at which they can hold an upper edge of the laid cloth Y as indicated by the imaginary lines.

Figure 16:
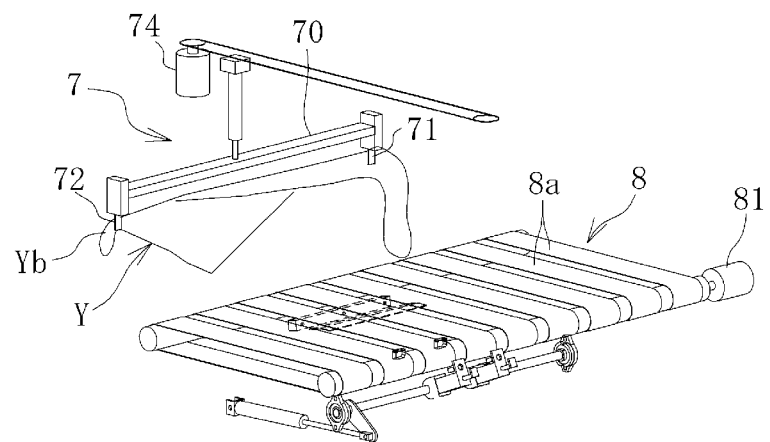
FIG. 16 is an enlarged perspective view of the two-position holding device, the edge locating conveyor, and the vertically inverting device of the automatic cloth spreading machine of FIG. 1.
Figure 17:
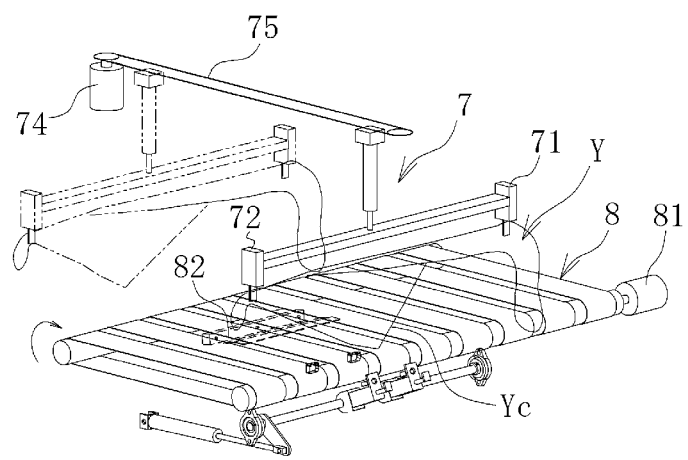
FIG. 17 is an enlarged perspective view of the two-position holding device, the edge locating conveyor, and the vertically inverting device of the automatic cloth spreading machine of FIG. 1.

When the upward-downward moving cylinder 73 extends thereby to move the two-position holding device 7 downward, as shown in FIG. 16, the corner end holding chuck 72 holds the front-side end portion (corner end) Yb of the cloth Y and the intermediate portion holding chuck 71 holds the intermediate portion on the rear side of the cloth Y. Here, as shown in FIG. 15, the opening degree of the chuck 69 provided near the rear side of the upper pressing plate 65 can be reduced from the wide-open state indicated by reference sign 69' to help the corner end holding chuck 72 hold the cloth Y. Thereafter, the cloth Y is released from the chuck 61, the upper pressing plate 65, and the chuck 69 of the horizontal pulling device 6 that have been holding or restraining the cloth Y. Then, as shown in FIG. 17, the two-position holding device 7 is moved by the forward-backward moving device from a position above the edge locating conveyor 8 toward a terminal end side of the edge locating conveyor 8. The belts of the edge locating conveyor 8 have moved in the arrow direction indicated in FIG. 17, and a triangular portion (a portion near Yc) of the cloth Y can come into contact with the edge locating conveyor 8. Air blown by a blowing device 82 installed between upper and lower portions of the belts of the edge locating conveyor 8 causes this triangular portion to trail in a flow direction of (move along) the edge locating conveyor 8.

Figure 18:
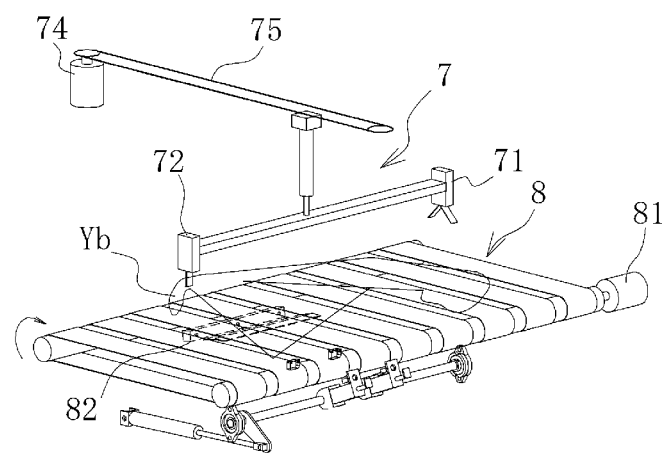
FIG. 18 is an enlarged perspective view of the two-position holding device, the edge locating conveyor, and the vertically inverting device of the automatic cloth spreading machine of FIG. 1.
Figure 19:
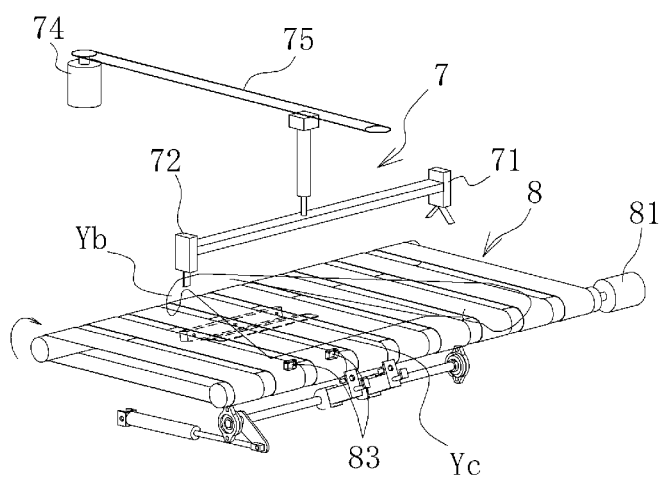
FIG. 19 is an enlarged perspective view of the two-position holding device, the edge locating conveyor, and the vertically inverting device of the automatic cloth spreading machine of FIG. 1.
Figure 20:
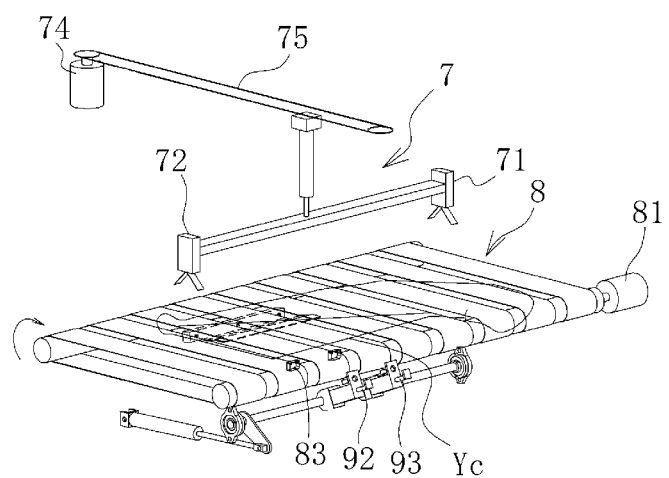
FIG. 20 is an enlarged perspective view of the two-position holding device, the edge locating conveyor, and the vertically inverting device of the automatic cloth spreading machine of FIG. 1.

Subsequently, as shown in FIG. 18, the chuck 71 on the rear side of the two-position holding device 7 releases the cloth Y, so that one-side part of the cloth Y (a part on the rear side from the corner end Yb) falls onto the moving belts of the edge locating conveyor 8. Since the front-side end portion (corner end Yb) of the cloth Y is still held by the corner end holding chuck 72, only the fallen portion of the cloth Y moves rightward as shown in FIG. 19. When this fallen portion of the cloth Y has moved a predetermined distance, the one long-side edge Yc of the cloth Y is disposed substantially orthogonal to the flow direction of the edge locating conveyor 8. When the long-side edge Yc is thus disposed, as shown in FIG. 20, the other chuck 72 releases the cloth Y, so that the entire cloth Y falls onto the edge locating conveyor 8. Two sensors 83 that detect the leading-side edge Yc of the cloth Y being transferred on the edge locating conveyor 8 are installed near a terminal end of the edge locating conveyor 8, and the edge locating conveyor 8 is switched to a low speed when the sensors 83 detect the cloth Y.

Figure 21:
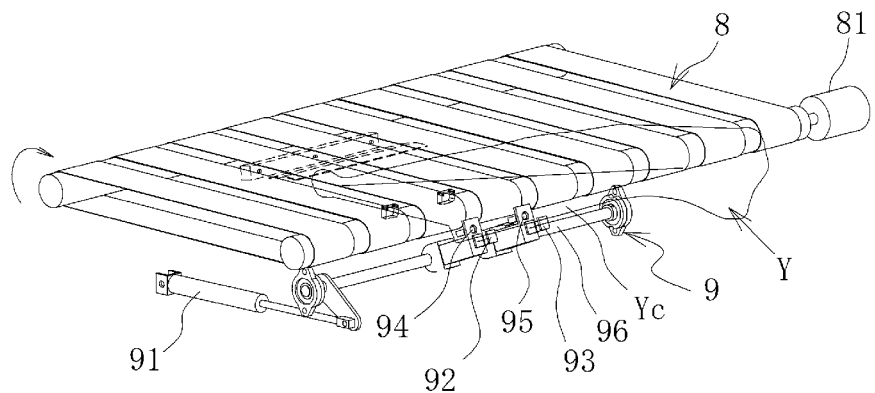
FIG. 21 is an enlarged perspective view of the edge locating conveyor and the vertically inverting device of the automatic cloth spreading machine of FIG. 1.
Figure 22:
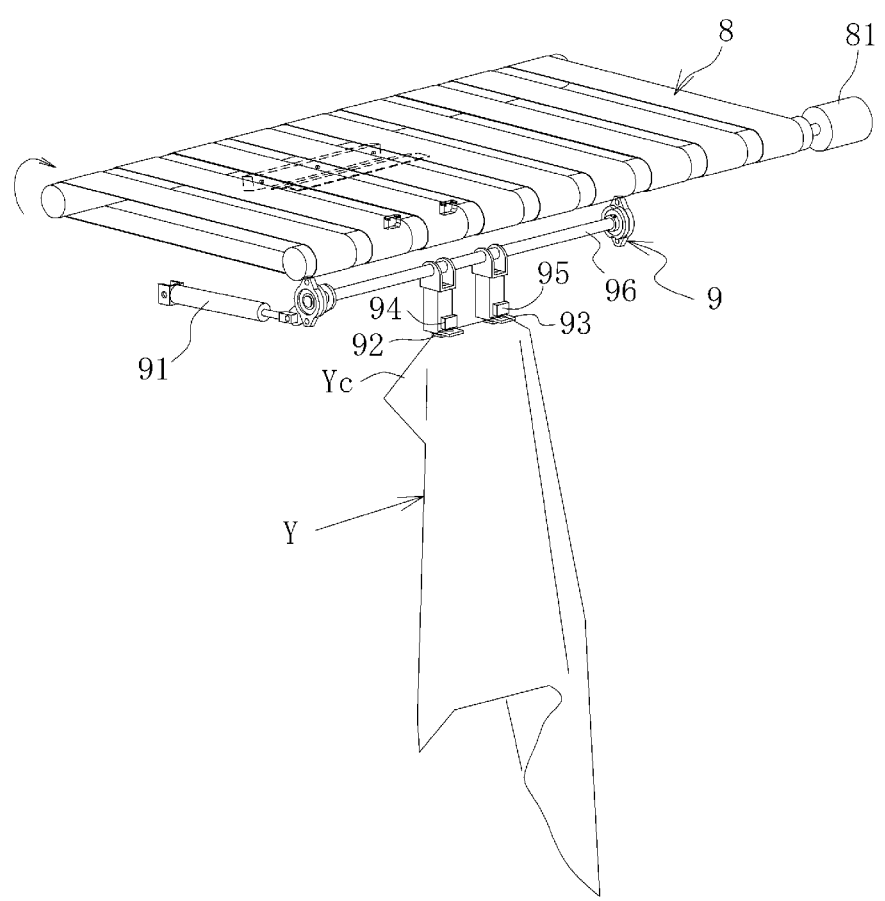
FIG. 22 is an enlarged perspective view of the edge locating conveyor and the vertically inverting device of the automatic cloth spreading machine of FIG. 1.

As shown in FIG. 21, the vertically inverting device 9 has: two chucks 92, 93 that are disposed near the terminal end of the edge locating conveyor 8 and hold the one long-side edge Yc of the cloth Y; two sensors 94, 95 provided near the chucks 92, 93; a reversing shaft 96 that supports the chucks 92, 93; and a turning cylinder 91 that turns the reversing shaft 96. Any mechanism may be used that can reverse the cloth Y held by the two chucks 92, 93, and instead of the turning cylinder 91, a motor that rotates the reversing shaft 96 in normal and reverse directions may also be used. The two chucks 92, 93 are configured to move independently of each other based on signals of the sensors 94, 95 detecting the side edge Yc of the cloth Y, and the side edge Yc of the cloth Y can be thereby held straight between the two chucks 92, 93.

The vertically inverting device 9 operates as follows: First, until the leading-side edge Yc of the cloth being transferred on the edge locating conveyor 8 is detected by the sensors 94, 95, the chucks 92, 93 remain on standby in a substantially horizontal (slightly upward-inclined) posture as shown in FIG. 20. When the leading-side edge Yc of the cloth Y being transferred on the edge locating conveyor 8 is detected by the sensors 94, 95, the chucks 92, 93 hold the leading-side edge Yc of the cloth based on detection signals from the sensors 94, 95. Immediately thereafter, the turning cylinder 91 contracts and causes the chucks 92, 93 to turn downward at a high speed while holding the side edge Yc of the cloth, thus assuming the downward-facing posture shown in FIG. 22. Here, the cloth Y having been held by the chucks 92, 93 is rapidly swung down (an unfurling action is exerted on the cloth in a short-side direction), so that the cloth Y droops. The chucks 92, 93 holding the side edge Yc of the cloth in the downward-facing posture release the held portions of the side edge Yc when these portions are passed to chucks 111, 112 of the hanging device 11 to be described below, and immediately thereafter are turned upward and returned to the original standby positions.

Figure 23:
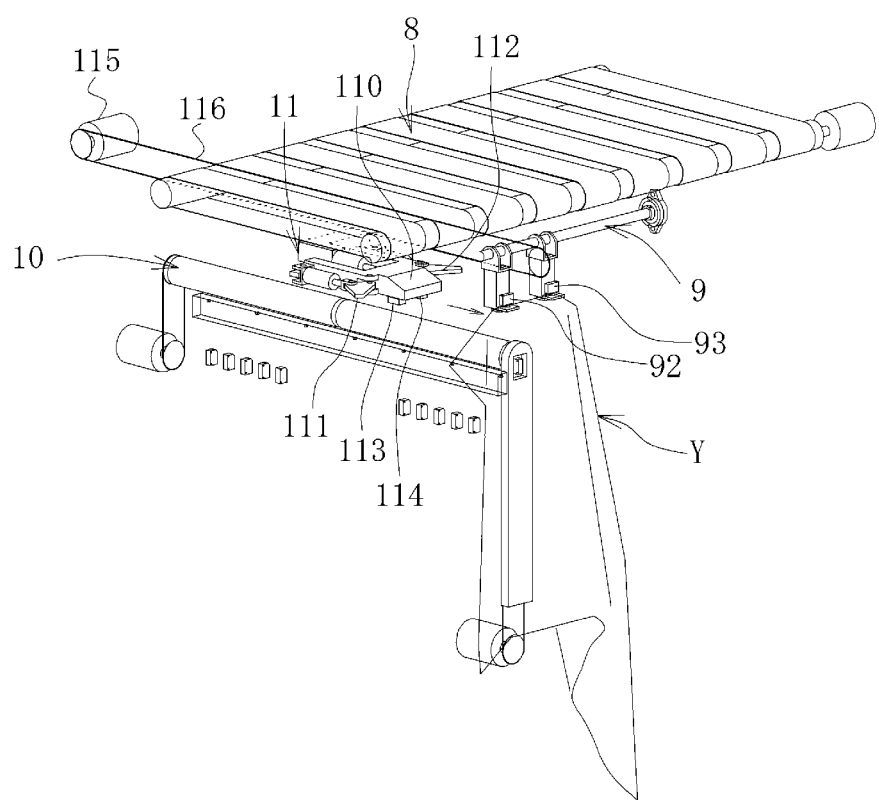
FIG. 23 is an enlarged perspective view of the edge locating conveyor, the vertically inverting device, a roller, and a hanging device of the automatic cloth spreading machine of FIG. 1.

As shown in FIG. 23, the roller 10 and the hanging device 11 that hangs the cloth Y on the roller 10 are installed directly under a front-side portion of the edge locating conveyor 8, with the hanging device 11 located on the upper side and the roller 10 on the lower side.

The hanging device 11 has a forward-backward moving platform 110 facing the vertically inverting device 9, the two chucks 111, 112 that are disposed on each side of the forward-backward moving platform 110 and receive the cloth Y from the chucks 92, 93 of the vertically inverting device 9, and chuck sensors 113, 114. The hanging device 11 is moved forward and backward in the left-right direction (in the direction of a rotational axis of the roller 10) by a forward-backward moving device. In the shown example, the forward-backward moving device is composed of a driving belt 116 that holds the forward-backward moving platform 110 and a motor 115 that rotates a pulley around which the driving belt 116 is wrapped. However, the forward-backward moving device may have any structure as long as it can move the chucks 111, 112 forward and backward in the left-right direction, and, for example, a forward-backward moving cylinder may also be used.

Figure 24:
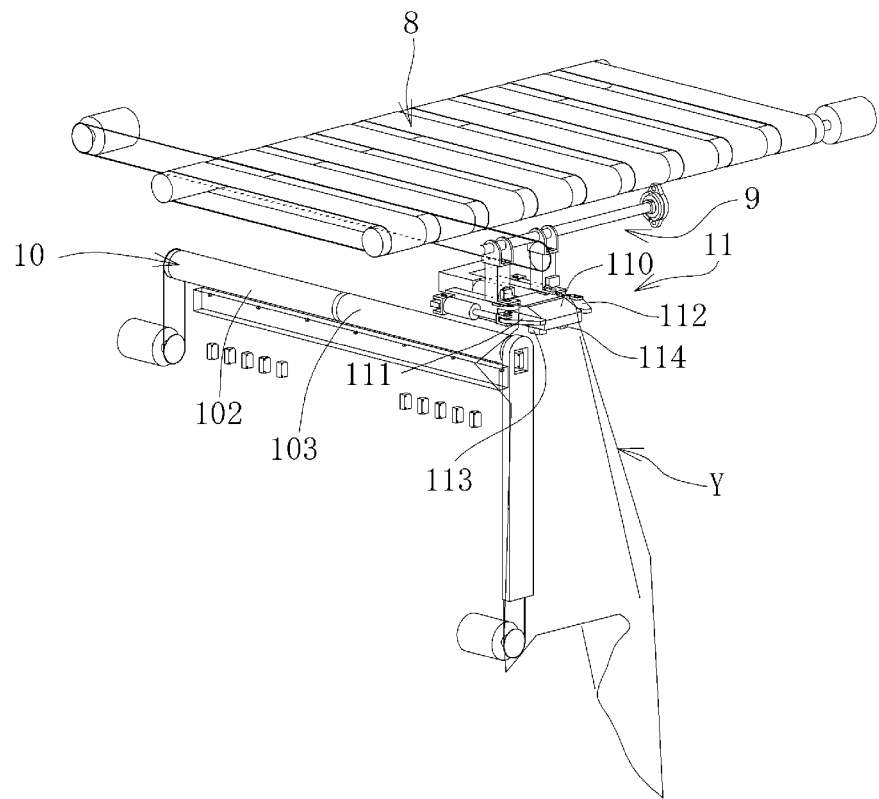
FIG. 24 is an enlarged perspective view of the edge locating conveyor, the vertically inverting device, the roller, and the hanging device of the automatic cloth spreading machine of FIG. 1.
Figure 25:
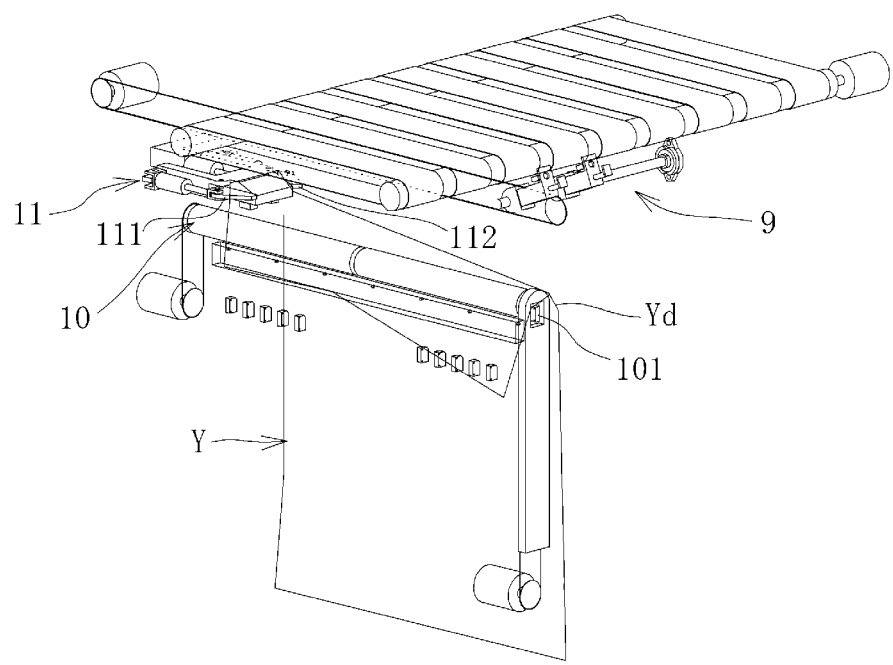
FIG. 25 is an enlarged perspective view of the edge locating conveyor, the vertically inverting device, the roller, and the hanging device of the automatic cloth spreading machine of FIG. 1.

The hanging device 11 moves closer to the cloth Y held by the vertically inverting device 9 from the standby position shown in FIG. 23. As shown in FIG. 24, when the chuck sensors 113, 114 detect the cloth Y, the chucks 111, 112 are closed toward both sides of the forward-backward moving platform 110 and hold the cloth Y. Here, the position at which the chucks 111, 112 hold the cloth Y is a position near the position at which the chucks 92, 93 of the vertically inverting device 9 hold the cloth Y. The two chucks 111, 112 may be configured to move separately and independently, and in that case, the portion of the side edge Yc of the cloth Y between the two chucks 111, 112 can be held straighter. As shown in FIG. 25, after passing the cloth Y, the vertically inverting device 9 turns around and returns to the original position, and moves away from the path of the hanging device 11. Since the roller 10 is disposed such that the rotational axis thereof is parallel to the forward-backward moving direction of the hanging device 11, when the hanging device 11 holding the cloth Y in a drooping state moves backward, as shown in FIG. 25, the cloth Y is hung on the roller 10 and droops from the roller 10. Here, a side edge Yd on the opposite side from the long-side edge Yc held by the chucks 111, 112 is detected by a sensor 101, and the chucks 111, 112 release the cloth Y after a predetermined time has elapsed since the detection. The predetermined time is appropriately set such that the chucks 111, 112 release the cloth Y when the center of the cloth Y in a width direction thereof substantially coincides with the center of the roller 10 in a width direction thereof. The hanging device 11 continues to move backward a predetermined distance also after the chucks 111, 112 release the cloth Y.

Figure 26:
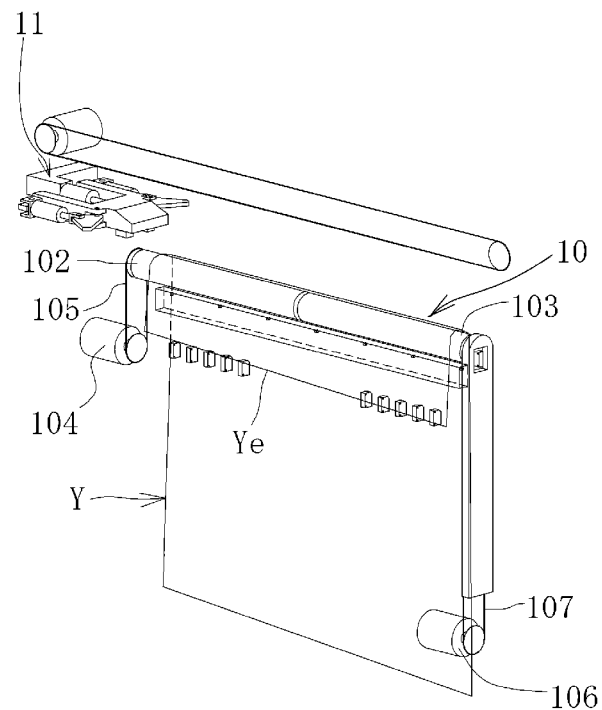
FIG. 26 is an enlarged perspective view of the roller and the hanging device of the automatic cloth spreading machine of FIG. 1.
Figure 27:
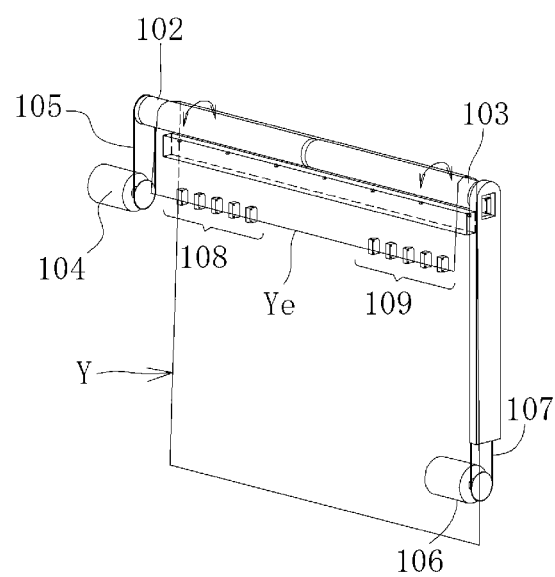
FIG. 27 is an enlarged perspective view of the roller of the automatic cloth spreading machine of FIG. 1.

As shown in FIG. 26, the roller 10 is composed of a first roller part 102 and a second roller part 103 adjoining to each other on the same axis. The first roller part 102 is connected to a motor 104 through a driving belt 105 and driven to rotate by the motor 104. The second roller part 103 is connected to a motor 106 through a driving belt 107 and driven to rotate by the motor 106. The rotation directions and the rotation speeds of the motors 104, 106 can be controlled separately and independently, and are preferably controlled separately and independently such that the direction of the cloth Y on the roller 10 can be corrected to the right direction (e.g., a direction in which a long-side direction of the cloth Y coincides with the front-rear direction) based on detection signals from a plurality of sensor groups 108, 109 that is arrayed under the roller parts 102, 103, parallel to the rotational axis of the rollers as shown in FIG. 27. For example, when the cloth Y is obliquely hung on the roller 10 as shown in FIG. 26, and only the sensor group 109 of the sensor groups 108, 109 detects a short-side edge Ye of the cloth Y as shown in FIG. 27, the first roller part 102 and the second roller part 103 are repeatedly stopped, rotated in a normal direction, and rotated in a reverse direction based on a detection result of the sensor group 109, until the side edge Ye becomes parallel to the sensor groups 108, 109 and both the sensor groups 108, 109 detect the short-side edge Ye of the cloth Y at the same time. In the shown example, each of the sensor groups 108, 109 consists of five sensors. However, the number of the sensors is not limited to five, and four or less or six or more sensors may be provided according to the width of the cloth Y to be processed, and the sensors to be activated may be switched according to the cloth Y to be processed.

Figure 28:
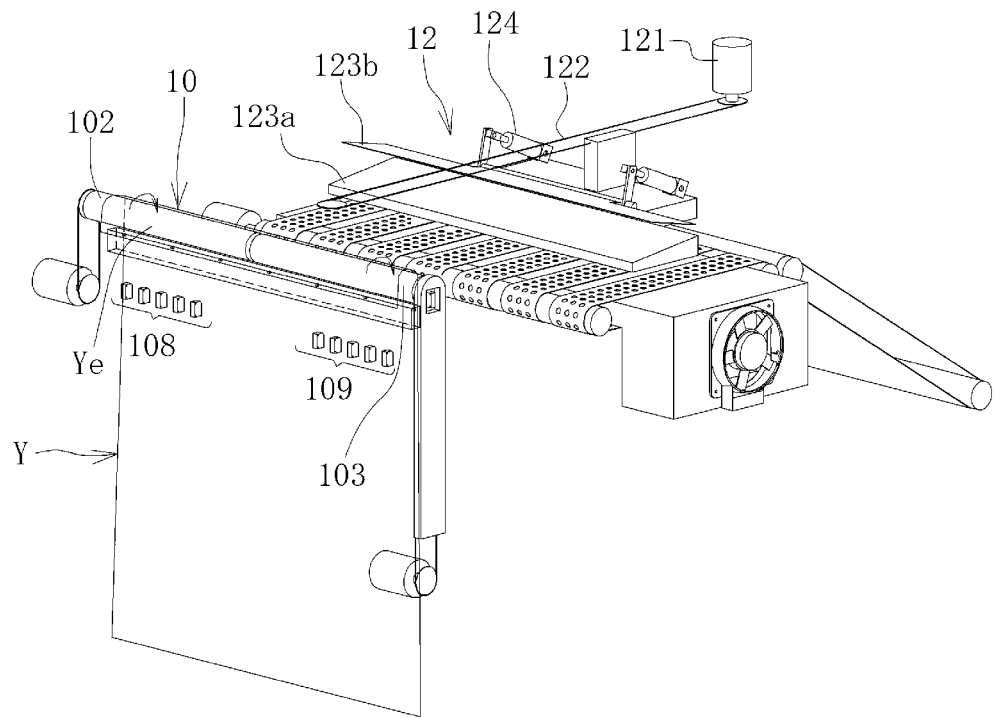
FIG. 28 is an enlarged perspective view of the roller, a forward-backward moving device, and a transfer conveyor of the automatic cloth spreading machine of FIG. 1.

The forward-backward moving device 12 moves the cloth Y having been oriented in the right direction on the roller 10 onto the transfer conveyor 13. As shown in FIG. 28, the forward-backward moving device 12 has a clamp unit that has a clamp width larger than the width of the cloth Y and holds a short-side end portion of the cloth Y, and a forward-backward moving mechanism that moves the clamp unit forward and backward in the front-rear direction. In this illustrated example, the clamp unit is composed of an inclined holding platform 123a facing the roller 10, and a holding plate 123b that is opened from and closed onto the holding platform 123a by a cylinder 124 or the like. The forward-backward moving mechanism is composed of a driving belt 122 that is coupled to the holding platform 123a and a motor 121 that rotates a pulley around which the driving belt 122 is wrapped. However, a forward-backward moving cylinder may also be used.

Figure 29:
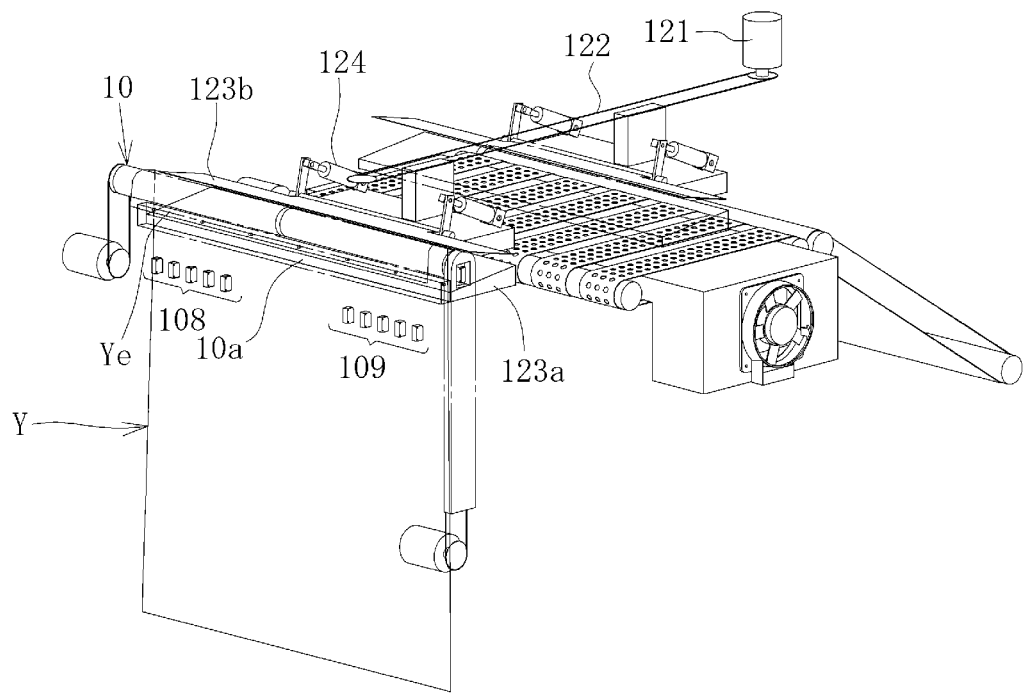
FIG. 29 is an enlarged perspective view of the roller, the forward-backward moving device, and the transfer conveyor of the automatic cloth spreading machine of FIG. 1.
Figure 30:
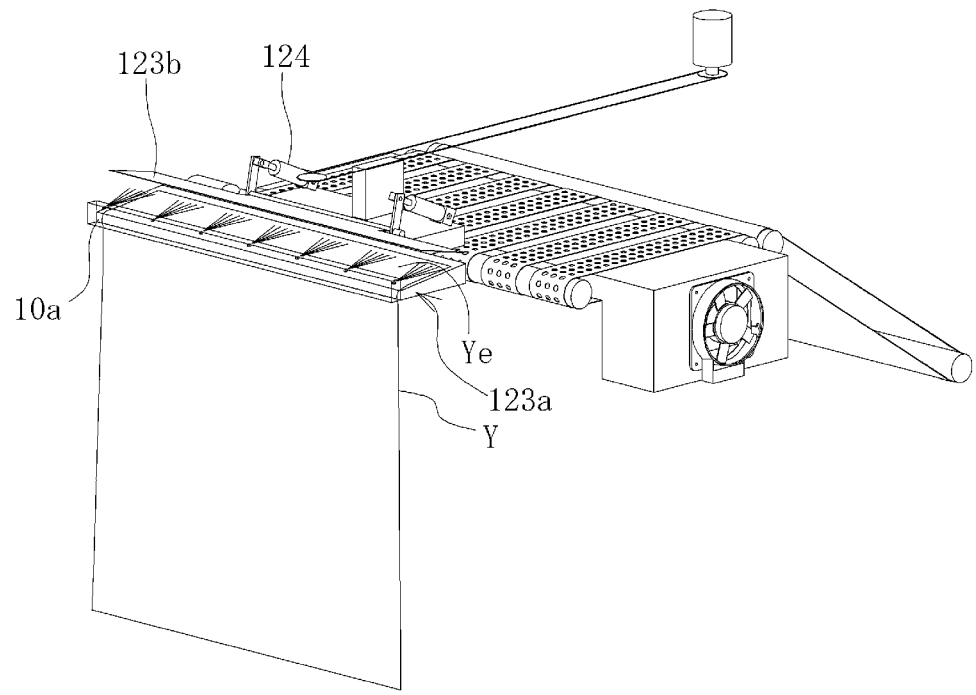
FIG. 30 is an enlarged perspective view of the forward-backward moving device and the transfer conveyor of the automatic cloth spreading machine of FIG. 1.
Figure 31:
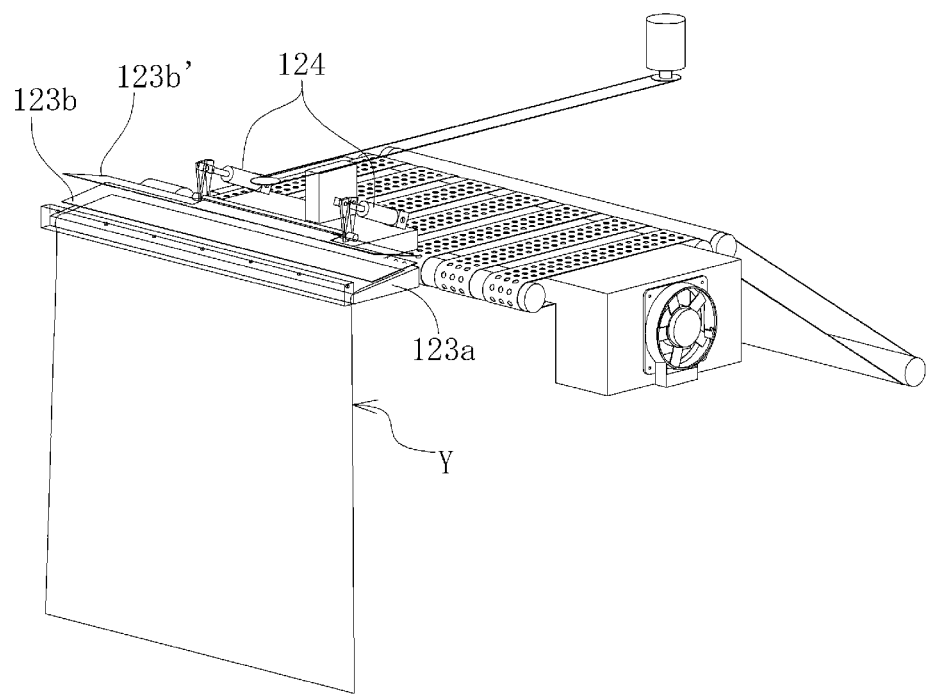
FIG. 31 is an enlarged perspective view of the forward-backward moving device and the transfer conveyor of the automatic cloth spreading machine of FIG. 1.
Figure 32:
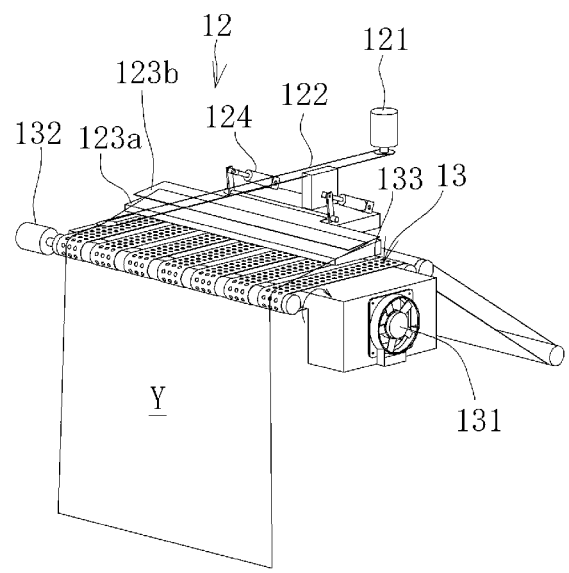
FIG. 32 is an enlarged perspective view of the forward-backward moving device and the transfer conveyor of the automatic cloth spreading machine of FIG. 1.
Figure 33:
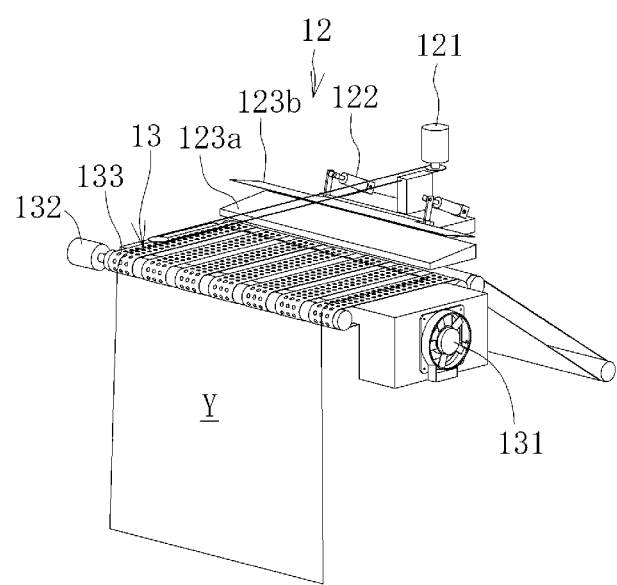
FIG. 33 is an enlarged perspective view of the forward-backward moving device and the transfer conveyor of the automatic cloth spreading machine of FIG. 1.

To move the cloth Y from the roller 10 onto the transfer conveyor 13 by the forward-backward moving device 12, as shown in FIG. 28, the first roller part 102 and the second roller part 103 are rotated toward the forward-backward moving device 12 at the same time and at the same speed, so that the side edge Ye of the cloth Y (upper end in the figure) located near the sensor groups 108, 109 is moved closer to the forward-backward moving device 12. Further, as shown in FIG. 29, the clamp unit of the forward-backward moving device 12 is moved forward, and a leading end of the holding platform 123a of the clamp unit with the holding plate 123b opened is pressed against a blowing member 10a installed under the roller 10, so as to sandwich a portion of the cloth Y on the roller 10, which is a portion on the side of the transfer conveyor 13, between the leading end of the holding platform 123a and the blowing member 10a. In this state, as shown in FIG. 30, air is ejected from the blowing member 10a and, at the same time, the first roller part 102 and the second roller part 103 are further rotated toward the forward-backward moving device 12. As a result, the side edge Ye of the cloth Y is placed on the holding platform 123a. Thereafter, as shown in FIG. 31, the holding plate 123b is closed and the side edge Ye of the cloth Y is held between the holding plate 123b and the holding platform 123a. The portion of the cloth Y other than the portion held between the holding platform 123a and the holding plate 123b of the clamp unit droops from the holding platform 123a. In this state, as shown in FIG. 32, the clamp unit of the forward-backward moving device 12 is moved toward the transfer conveyor 13. After the clamp unit is moved backward a predetermined distance, as shown in FIG. 33, the holding plate 123b is opened again and the cloth Y is moved onto the transfer conveyor 13. The clamp unit of the forward-backward moving device 12 continues to be moved backward a predetermined distance also after the holding plate 123*b* releases the cloth Y.

Figure 34:
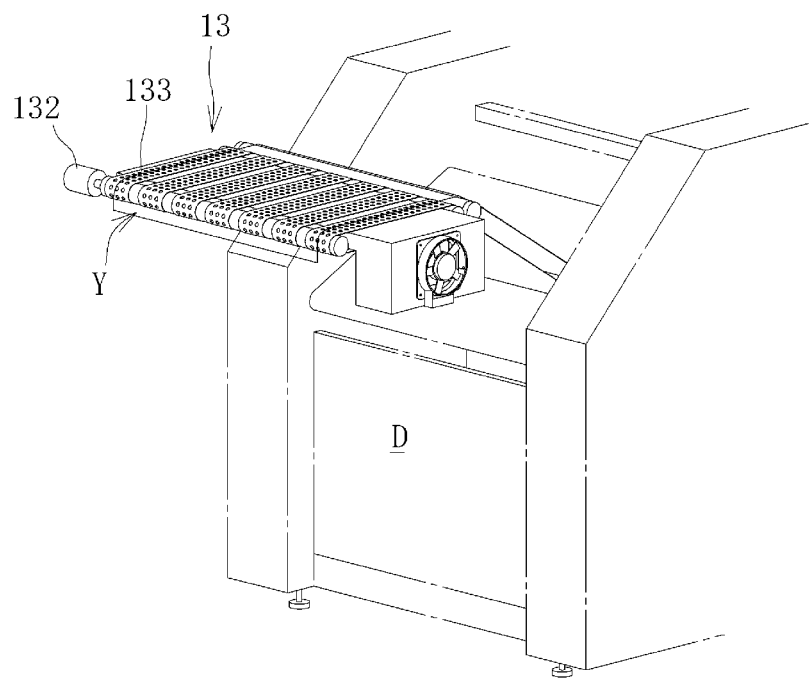
FIG. 34 is an enlarged perspective view of the transfer conveyor of the automatic cloth spreading machine of FIG. 1 and a cloth folding machine in the next step.

As shown in FIG. 33, the transfer conveyor 13 has a belt 133 having a large number of through-holes, a motor 132 that drives the belt 133, and a suction fan 131 that suctions the cloth Y on the belt 133 through the through-holes formed in the belt 133. As the cloth Y on the transfer conveyor 13 is thus suctioned, the side edge Ye of the cloth Y held by the clamp unit of the forward-backward moving device 12 can fall and smoothly move onto the transfer conveyor 13. Thereafter, as shown in FIG. 34, the transfer conveyor 13 discharges the cloth Y and transfers (feeds) the cloth Y to the next step (here, the cloth folding machine D). The belt 133 of the transfer conveyor 13 need not be driven while the clamp unit of the forward-backward moving device 12 moves the cloth Y onto the transfer conveyor 13. However, it is preferable that the belt 133 be driven from the viewpoint of increasing the number of pieces processed.

According to the automatic cloth spreading machine configured as described above, the washed and dried cloth Y is simply fed onto the supply conveyor 1, whereby the cloth Y can be automatically spread and transferred (fed) to the next step by the lifting device 2, the temporary holding device 3, the corner end locating device 4, the corner end receiving device 5, the horizontal pulling device 6, the two-position holding device 7, the edge locating conveyor 8, the vertically inverting device 9, the roller 10, the hanging device 11, the forward-backward moving device 12, the transfer conveyor 13 and so on.

Then, an embodiment of the cloth clamping chuck according to the present invention will be described in detail with reference to FIGS. 35 to 40. The cloth clamping chuck of this embodiment can be adopted to chucks 21, 31, 41, 51, 61, 71, 72 and so on in the lifting device 2, the temporary holding device 3, the corner end locating device 4, the corner end receiving device 5, the horizontal pulling device 6, the two-position holding device 7 and so on as various cloth handling devices in the above automatic cloth spreading machine. In this case, the upward-downward moving device of the lifting device 2, the forward-backward moving device of the temporary holding device 3, the forward-backward moving device of the corner end locating device 4, the forward-backward moving device of the corner end receiving device 5, the forward-backward moving device of the horizontal pulling device 6, the upward-downward moving cylinder 73 and forward-backward moving device of the two-position holding device 7 correspond to the moving means of the cloth handling device according to the present invention.

The cloth clamping chuck of the present invention utilizes a feature that the clamped cloth is hardly shifted in a direction along an open-close axis of the chuck jaw. This is due to the fact that a force applied to the chuck jaw from the cloth in the direction along the open-close axis of the chuck jaw does not act to the direction of opening the chuck jaw.

Figure 35:
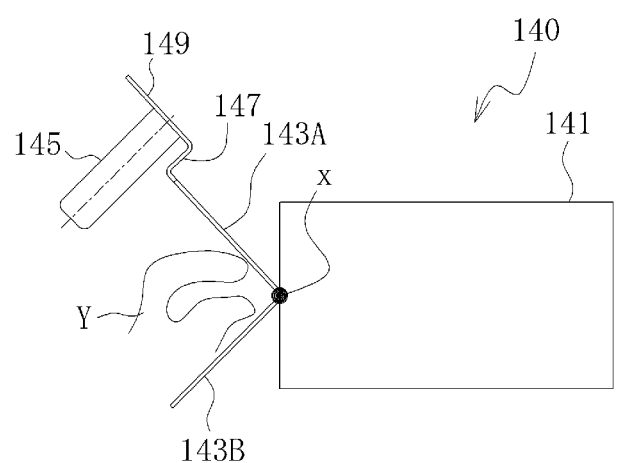
FIG. 35 shows a cloth clamping chuck of an opened state according to an embodiment of the present invention, wherein FIG. 35($a$) is a plan view and FIG. 35($b$) is a side view.
Figure 35:
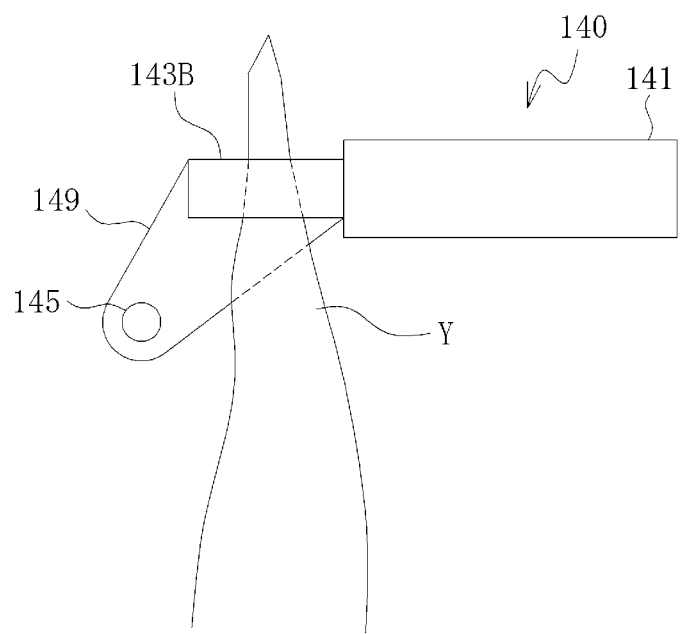

FIG. 35 shows a cloth clamping chuck according to an embodiment of the present invention, where (a) is a plan view and (b) is a side view. The cloth clamping chuck of this embodiment comprises a main body 141 and a pair of plate-like chuck jaws 143A, 143B supported by the main body 141 rotatably (swingably) around an open-close axis x. In the inside of the main body 141, there are disposed a driving means not shown comprising a driving source such as an air cylinder, a motor or the like and a transmission mechanism transmitting the power force to the chuck jaws 143A, 13B to revolve the chuck jaws 143A, 143B around the open-close axis x. In the illustrated example, the open-close axis x of the chuck jaw 143A is configured to match with the open-close axis x of the chuck jaw 143B, but the open-close axis x of the chuck jaw 143A and the open-close axis x of the chuck jaw 143B may be arranged at different positions, as far as the cloth Y can be clamped releasably by the rotating operation of the chuck jaws 143A, 143B. Furthermore, in the illustrated example, the chuck jaws 143A, 143B are configured to change the opening degree by revolving both the chuck jaws 143A, 143B, but the opening degree of the chuck jaws 143A, 143B may be changed by revolving only one of the chuck jaws 143A, 143B.

The cloth clamping chuck 140 is provided with a catching portion 145 at a position out of an extension line of the chuck jaw 143A, 143B (back side and/or front side of the chuck jaw viewing from the direction of the open-close axis x). In the illustrated example, the catching portion 145 is rod-like, but it may be plate-like. When the catching portion 145 is plate-like, it is preferable to form a contact portion with the cloth Y into a curved face to avoid damage of the cloth Y. The catching portion 145 is disposed on a front-end portion of a support plate 149 and vertically thereto. Here, the support plate 149 extends from one chuck jaw 143A through a stepwise part 147 facing outward, in parallel to and in a downward and obliquely-forwarded direction. Thus, the catching portion 145 is operated together with the chuck jaw 143A and extended in a direction perpendicular to the open-close axis x and the pulling direction at a closed posture of the chuck jaws 143A, 143B. Further, the catching portion 145 is arranged in front of the top of the chuck jaw 143A, 143B through the outward stepwise part 147 and the support plate 149. The catching portion 145 and the support plate 149 may be united integrally with the chuck jaw 143A, or they may be formed as a separate from the chuck jaw 143A and joined with a fixing tool such as screw, bolt and the like or by welding.

Figure 36:
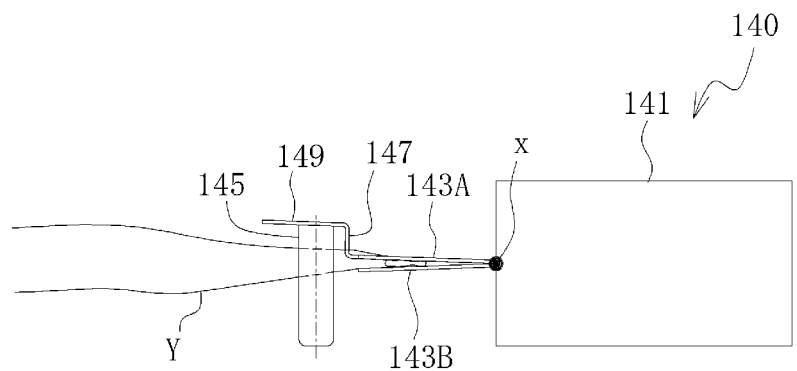
FIG. 36 is a schematic view explaining dispersion and deflection of a force applied to cloth when chuck jaws in the cloth clamping chuck of FIG. 35 are closed and moved to a pulling direction, wherein FIG. 36($a$) is a plan view and FIG. 36($b$) is a side view.
Figure 36:
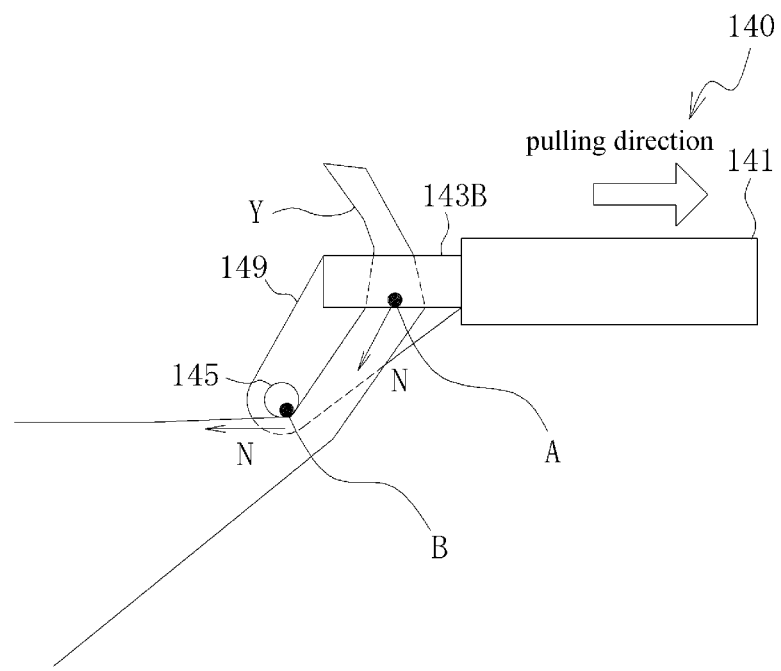

In the cloth clamping chuck 140 provided with the catching portion 145, as shown in FIG. 35, the neighborhood of the corner end of the cloth Y is positioned between the pair of the opened chuck jaws 143A, 143B, and then the pair of the chuck jaws 143A, 143B are closed by rotating around the open-close axis x through the driving means in the main body 141, whereby the cloth Y is rendered into a clamped state between the pair of the chuck jaws 143A, 143B. When the cloth clamping chuck 140 is moved from this state in the pulling direction (direction from the tip of the chuck jaws 143A, 143B to the base end thereof) by the moving means (not shown) of the cloth handling device as shown in FIG. 36, a portion of the cloth Y lower than the clamped portion is caught by the catching portion 145 thereby to disperse a force N applied to the cloth Y into two points A and B. In the point A, the force N is deflected toward a direction where the cloth Y is hardly shifted from the chuck jaws (direction along the open-close axis x of the chuck jaw 143A, 143B) and acts on the point A, so that damages of the cloth Y associated with falling-off from the chuck jaw 143A, 143B or position shifting are suppressed.

Also, the catching portion 145 is arranged forward of the tip of the chuck jaw 143A, 143B. Thus, when the cloth Y is passed from the cloth clamping chuck 140 to another chuck, the catching portion 145 does not interfere with the chuck and can smoothly pass the cloth Y.

Figure 37:
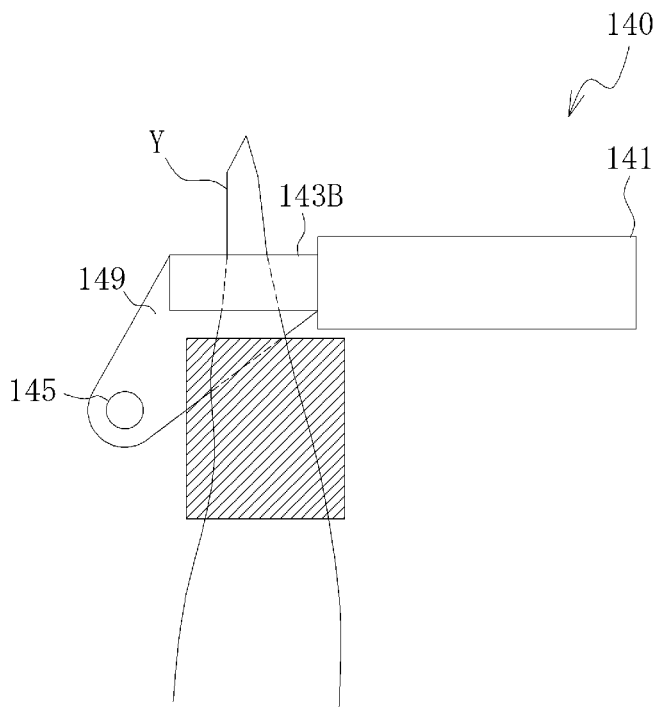
FIG. 37 is a schematic view illustrating a modification example of an arrangement of a catching portion.

In order to disperse and deflect the force applied to the cloth Y associated with the puling operation of the cloth clamping chuck 140, the catching portion 145 is enough to be arranged in a position out of the extension line of the chuck jaw 143A, 143B, and as shown in FIG. 37, it may be arranged right under (shaded area in the figure) or right above the chuck jaw 143A, 143B. According to such an arrangement configuration, the force N applied to the cloth Y in the point A is further deflected toward a side along the open-close axis x, so that the effect of suppressing the falling-off or damaging of the cloth becomes larger. In this case, it is preferable to pass the cloth Y from the cloth clamping chuck 140 to another chuck in an area outside the shaded area.

Figure 38:
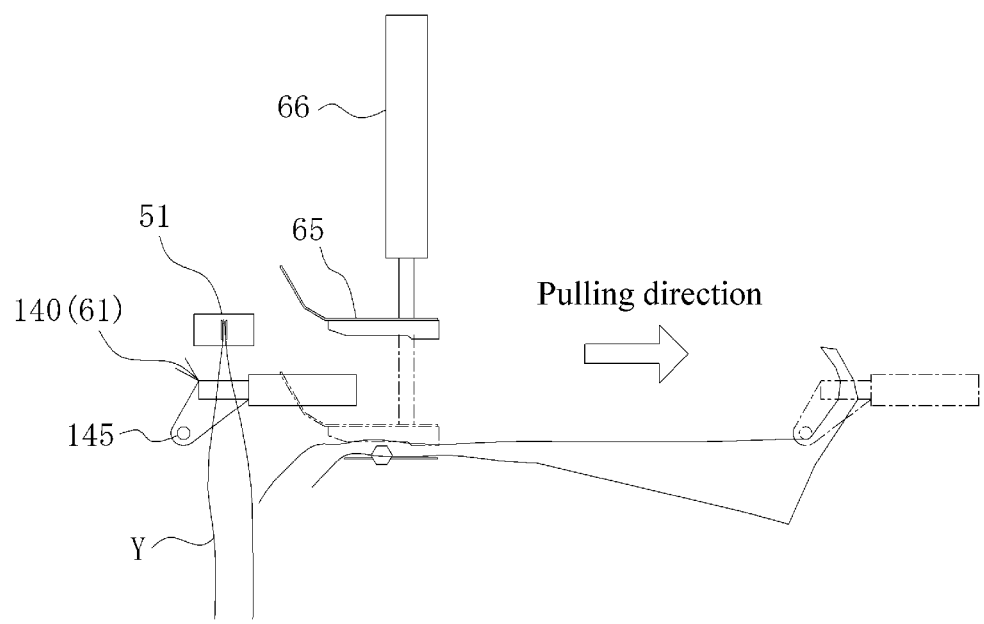
FIG. 38 is a schematic view illustrating a use example of the cloth clamping chuck of FIG. 35.
Figure 39:
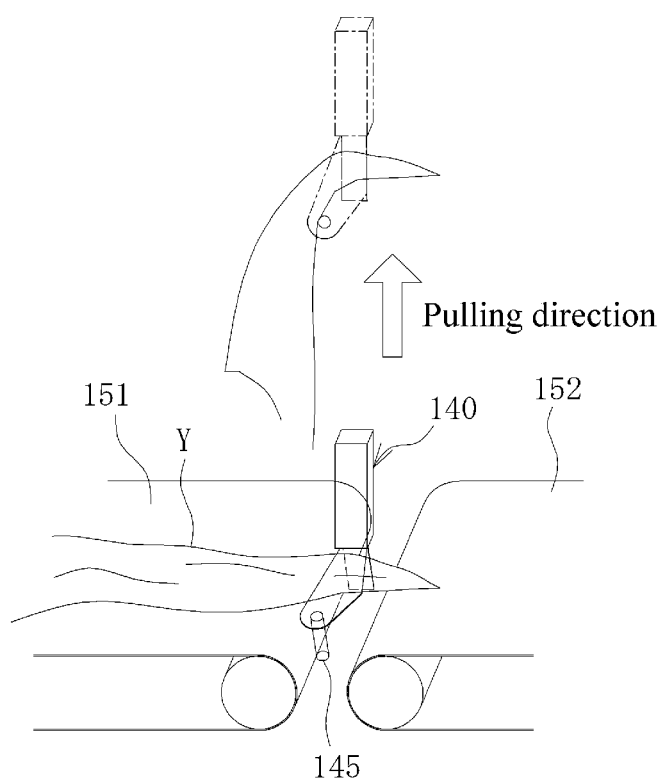
FIG. 39 is a schematic view illustrating another use example of the cloth clamping chuck of FIG. 35.
Figure 40:
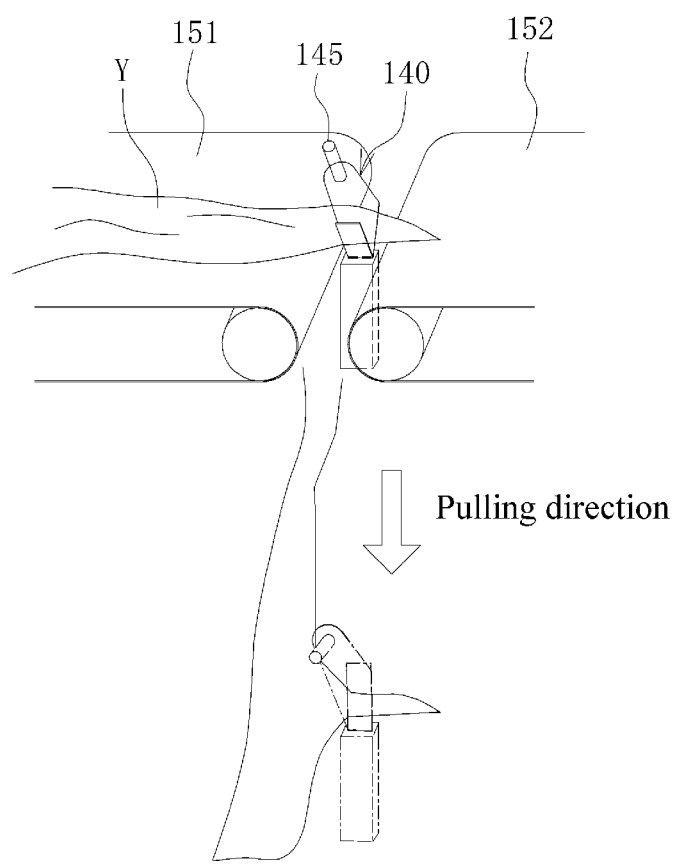
FIG. 40 is a schematic view illustrating the other use example of the cloth clamping chuck of FIG. 35.
Figure 41:
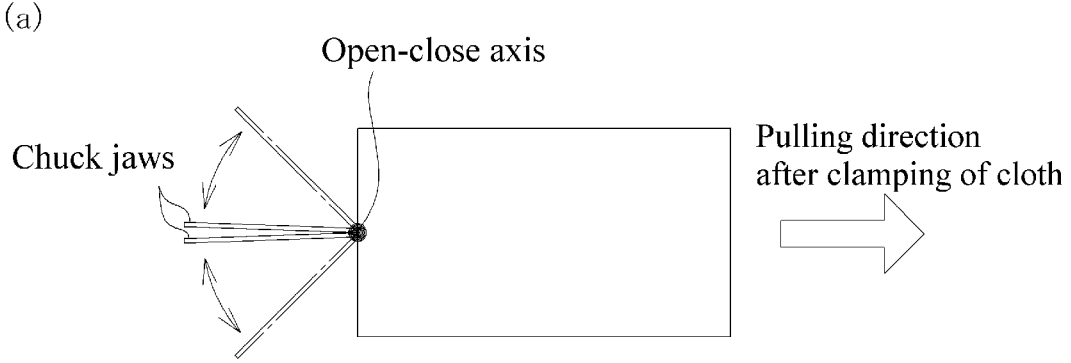
FIG. 41 shows the conventional cloth clamping chuck, wherein FIG. 41($a$) is a plan view of a fulcrum opening type chuck which opens and closes both chuck jaws and FIG. 41($b$) is a plan view of a fulcrum opening type chuck which opens and closes only one chuck jaw.
Figure 41:
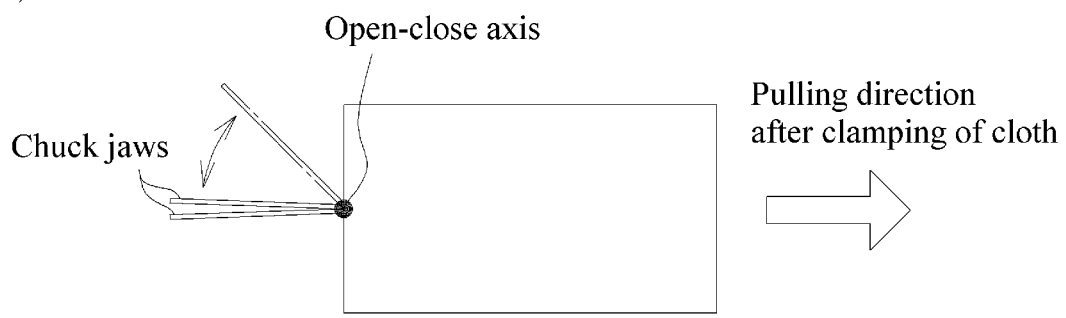
Figure 42:
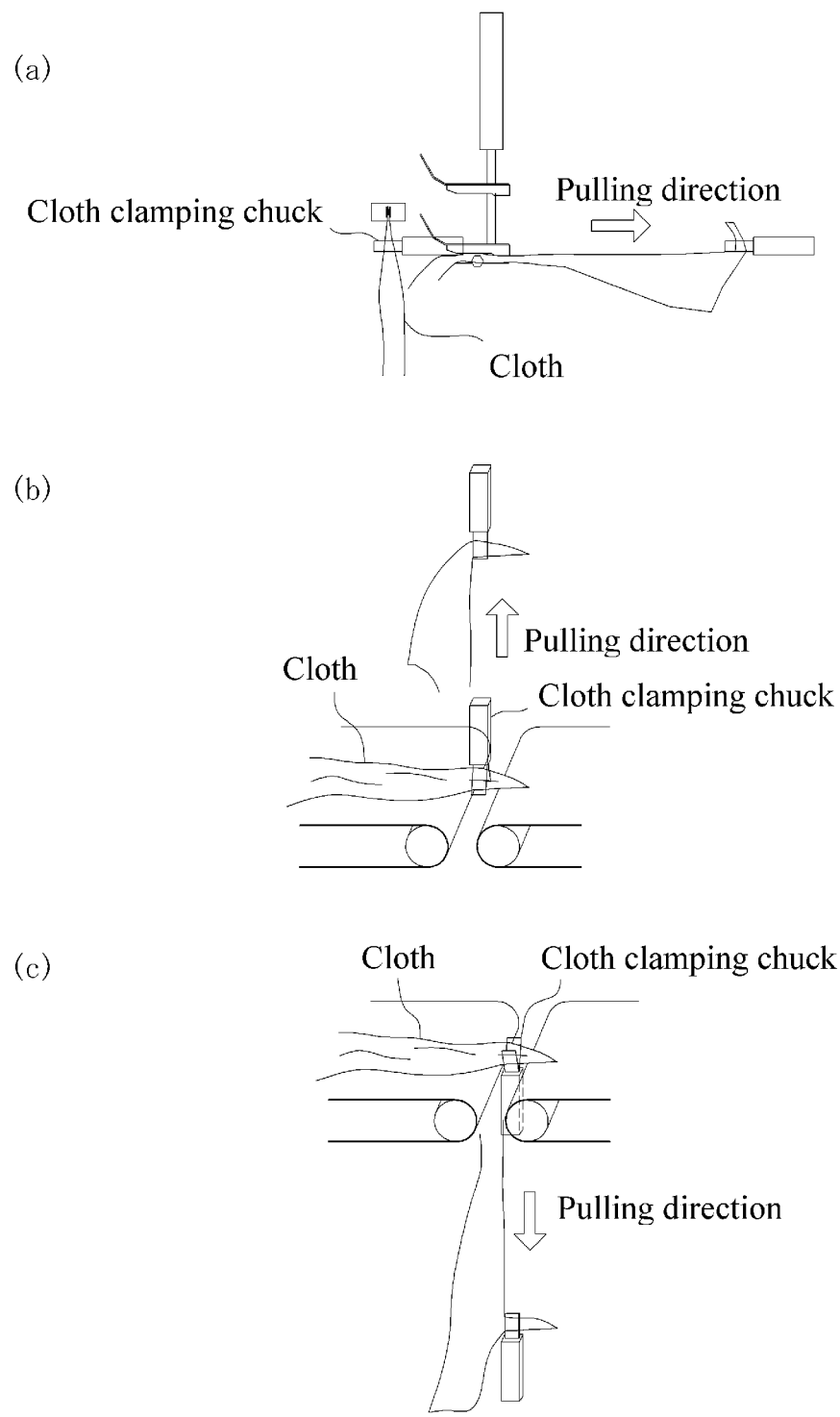
FIGS. 42($a$) to 42($c$) are views illustrating states of pulling-in, lifting and pulling-down cloth with the conventional cloth clamping chuck.
Figure 43:
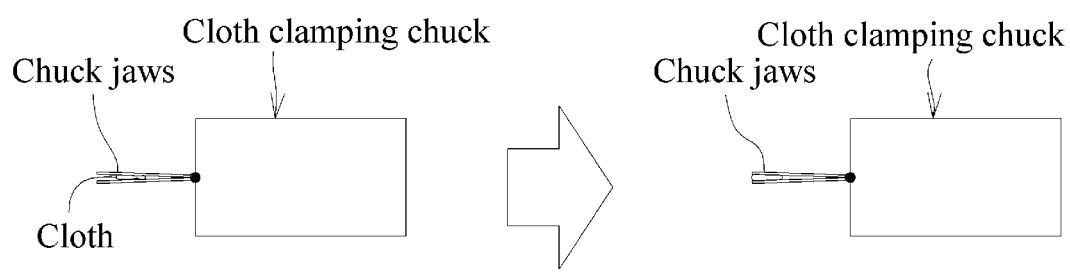
FIG. 43 is a view explaining problems of the conventional cloth clamping chuck.
Figure 43:
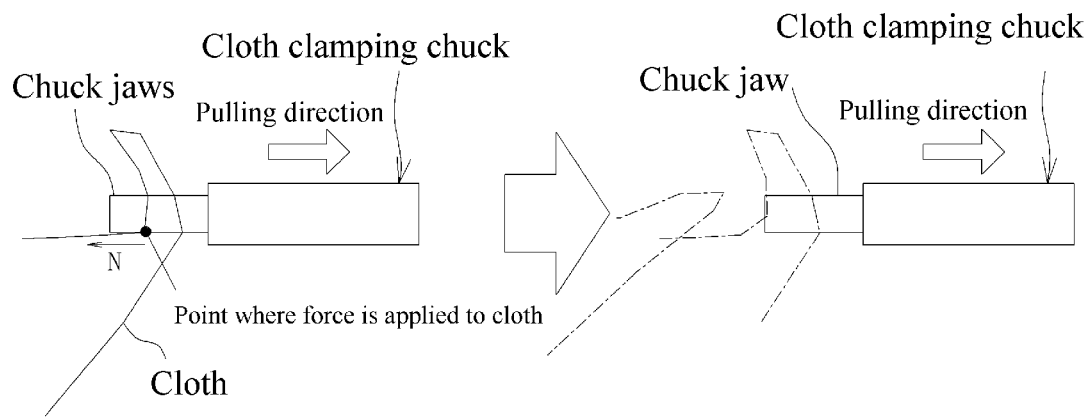

FIGS. 38 to 40 show a use example of the cloth clamping chuck 140 according to this embodiment. FIG. 38 shows a state that the cloth clamping chuck 140 of this embodiment is adopted to the chuck 61 of the horizontal pulling device 6 as the cloth handling device described with reference to FIGS. 11 to 15 and the cloth clamping chuck 140 clamps the neighborhood of the corner end of the cloth Y and moves in the right direction in the figure as the pulling direction by a moving means not shown. FIG. 39 shows a state that the cloth clamping chuck 140 is moved downward to a position between the adjoining conveyors 151, 152 by a moving means not shown to clamp the cloth Y that is transferred on the conveyor 151 and then the cloth clamping chuck 140 is moved upward as the pulling direction. FIG. 40 shows a state that the cloth clamping chuck 140 is moved upward to a position between the adjoining conveyors 151,152 by a moving means not shown to clamp the cloth Y that is transferred on the conveyor 151 and then the cloth clamping chuck 140 is moved downward as the pulling direction.

Although the present invention is described with reference to the drawings, the present invention is not limited to the shown embodiments and various changes, additions and modifications can be made. For example, the catching portion is disposed below the chuck jaw 143A, 143B in the shown example viewing from a side of FIG. 35(*b*), but may be disposed above the chuck jaw 143A, 143B instead thereof or in addition thereto.

INDUSTRIAL APPLICABILITY

According to the present invention, the falling-off of the cloth can be reduced while avoiding the damage of the cloth when the cloth is clamped with the cloth clamping chuck and moved in the pulling direction.

REFERENCE SIGNS LIST

1 Supply conveyor
2 Lifting device
3 Temporary holding device
4 Corner end locating device
5 Corner end receiving device
6 Horizontal pulling device
7 Two-position holding device
8 Edge locating conveyor
9 Vertically inverting device
10 Roller
11 Hanging device
12 Forward-backward moving device
13 Transfer conveyor
140 Cloth clamping chuck
141 Main body
143*a*, 143B Chuck jaw
145 Catching portion
147 Outward step part
149 Support plate
x Open-close axis

The invention claimed is:

1. A cloth clamping chuck comprising
a pair of chuck jaws, and
a driving means that changes an opening degree of the pair of chuck jaws by rotating at least one of the pair of chuck jaws around an open-close axis, wherein
the cloth clamping chuck is configured to conduct a pulling operation in an extending direction of the pair of chuck jaws after the pair of chuck jaws are closed to clamp cloth in a direction along the open-close axis,
the cloth clamping chuck includes a catching portion that is offset from an extension line of the chuck jaw, the offset being along a direction parallel to the open-close axis, and
in association with the pulling operation, the catching portion is configured to be caught on a portion of the cloth other than the portion clamped by the pair of chuck jaws to deflect a force applied to the clamped portion of the cloth toward the side along the open-close axis.

2. The cloth clamping chuck according to claim 1, wherein
the catching portion extends in a direction perpendicular to the open-close axis and the pulling direction at a closed posture of the pair of chuck jaws.

3. The cloth clamping chuck according to claim 2, wherein
the catching portion is forward of the tip of the chuck jaw.

4. A cloth handling device comprising a cloth clamping chuck as claimed in claim 3 and a moving means for conducting the pulling operation of the cloth clamping chuck.

5. A cloth handling device comprising a cloth clamping chuck as claimed in claim 2 and a moving means for conducting the pulling operation of the cloth clamping chuck.

6. The cloth clamping chuck according to claim 1, wherein
the catching portion is forward of the tip of the chuck jaw.

7. A cloth handling device comprising a cloth clamping chuck as claimed in claim 6 and a moving means for conducting the pulling operation of the cloth clamping chuck.

8. A cloth handling device comprising a cloth clamping chuck as claimed in claim 1 and a moving means for conducting the pulling operation of the cloth clamping chuck.

9. A cloth clamping chuck comprising
a pair of chuck jaws, and
a driving means that changes an opening degree of the pair of chuck jaws by rotating at least one of the pair of chuck jaws around an open-close axis, wherein
the cloth clamping chuck is configured to conduct a pulling operation after the pair of chuck jaws are closed to clamp cloth,
the cloth clamping chuck includes a catching portion that is arranged in a position out of an extension line of the chuck jaw, and in associated with the pulling operation, is configured to be caught on a portion of the cloth other than the portion clamped by the pair of chuck jaws to deflect a force applied to the clamped portion of the cloth toward a side along the open-close axis,
the catching portion extends in a direction perpendicular to the open-close axis and the pulling direction at a closed posture of the pair of chuck jaws, and
the catching portion is forward of the tip of the chuck jaw.

10. A cloth handling device comprising a cloth clamping chuck as claimed in claim 9 and a moving means for conducting the pulling operation of the cloth clamping chuck.

11. A cloth clamping chuck comprising a pair of chuck jaws, and one of an air cylinder and a motor that changes an opening degree of the pair of chuck jaws by rotating at least one of the pair of chuck jaws around an open-close axis, wherein the cloth clamping chuck is configured to conduct a pulling operation in an extending direction of the pair of chuck jaws after the pair of chuck jaws are closed to clamp cloth in a direction along the open-close axis, the cloth clamping chuck includes a catching portion that is offset from an extension line of the chuck jaw, the offset being along a direction parallel to the open-close axis, and in association with the pulling operation, the catching portion is configured to be caught on a portion of the cloth other than the portion clamped by the pair of chuck jaws to deflect a force applied to the clamped portion of the cloth toward the side along the open-close axis.

12. The cloth clamping chuck according to claim 11, wherein the catching portion extends in a direction perpendicular to the open-close axis and the pulling direction at a closed posture of the pair of chuck jaws.

13. The cloth clamping chuck according to claim 12, wherein the catching portion is forward of the tip of the chuck jaw.

14. A cloth handling device comprising a cloth clamping chuck as claimed in claim 13 and a moving means for conducting the pulling operation of the cloth clamping chuck.

15. A cloth handling device comprising a cloth clamping chuck as claimed in claim 12 and a moving means for conducting the pulling operation of the cloth clamping chuck.

16. The cloth clamping chuck according to claim 11, wherein the catching portion is forward of the tip of the chuck jaw.

17. A cloth handling device comprising a cloth clamping chuck as claimed in claim 16 and a moving means for conducting the pulling operation of the cloth clamping chuck.

18. A cloth handling device comprising a cloth clamping chuck as claimed in claim 11 and a moving means for conducting the pulling operation of the cloth clamping chuck.

* * * * *